(12) United States Patent
Furuya et al.

(10) Patent No.: US 8,902,130 B2
(45) Date of Patent: Dec. 2, 2014

(54) IMAGE DISPLAY DEVICE

(75) Inventors: Hiroyuki Furuya, Fukuoka (JP);
Shinichi Shikii, Nara (JP); Keiji Sugiyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 182 days.

(21) Appl. No.: 13/379,519

(22) PCT Filed: Apr. 19, 2011

(86) PCT No.: PCT/JP2011/002290
§ 371 (c)(1),
(2), (4) Date: Dec. 20, 2011

(87) PCT Pub. No.: WO2011/132407
PCT Pub. Date: Oct. 27, 2011

(65) Prior Publication Data
US 2012/0098819 A1     Apr. 26, 2012

(30) Foreign Application Priority Data

Apr. 20, 2010  (JP) ................................. 2010-096791

(51) Int. Cl.
*G09G 5/00* (2006.01)
*G02B 27/01* (2006.01)
*B60K 35/00* (2006.01)
*G02B 5/32* (2006.01)
*G02B 26/10* (2006.01)
*G02B 5/18* (2006.01)

(52) U.S. Cl.
CPC ..... *G02B 27/0101* (2013.01); *B60K 2350/2052* (2013.01); *B60K 35/00* (2013.01); *G02B 5/32* (2013.01); *G02B 2027/0112* (2013.01); *G02B 26/10* (2013.01); *G02B 5/18* (2013.01)

USPC .................................. 345/7; 359/630; 349/11

(58) Field of Classification Search
USPC ........ 345/1.1, 7, 8, 204; 348/115; 353/13, 79; 349/11; 359/13, 630
See application file for complete search history.

(56) References Cited

U.S. PATENT DOCUMENTS

| | | | | |
|---|---|---|---|---|
| 6,140,979 A | * | 10/2000 | Gerhard et al. | 345/7 |
| 2005/0140929 A1 | * | 6/2005 | Nambudiri et al. | 353/31 |
| 2007/0195279 A1 | * | 8/2007 | Park | 353/52 |
| 2009/0096724 A1 | | 4/2009 | Ichikawa et al. | |
| 2009/0160736 A1 | * | 6/2009 | Shikita | 345/7 |
| 2009/0274178 A1 | * | 11/2009 | Gollier et al. | 372/22 |

FOREIGN PATENT DOCUMENTS

| | | | |
|---|---|---|---|
| JP | 9-68917 | | 3/1997 |
| JP | 9-222582 | | 8/1997 |
| JP | 09222582 A | * | 8/1997 |
| JP | 9-292527 | | 11/1997 |
| JP | 10-307529 | | 11/1998 |

(Continued)

OTHER PUBLICATIONS

International Search Report issued Aug. 9, 2011 in International (PCT) Application No. PCT/JP2011/002290.

*Primary Examiner* — Koosha Sharifi-Tafreshi
(74) *Attorney, Agent, or Firm* — Wenderoth, Lind & Ponack, L.L.P.

(57) ABSTRACT

An image display device includes a laser source for emitting a laser beam, an image forming element which uses the laser beam to emit image light for displaying an image, a first diffraction element for diffracting the image light, and a controller for controlling a display position of the image on the basis of a wavelength of the laser beam and a temperature of the first diffraction element.

17 Claims, 14 Drawing Sheets

(56) References Cited

FOREIGN PATENT DOCUMENTS

| JP | 2000-132073 | 5/2000 |
| JP | 2007-226190 | 9/2007 |
| JP | 2008-102442 | 5/2008 |
| JP | 2009-99701 | 5/2009 |
| JP | 2011-90076 | 5/2011 |

* cited by examiner

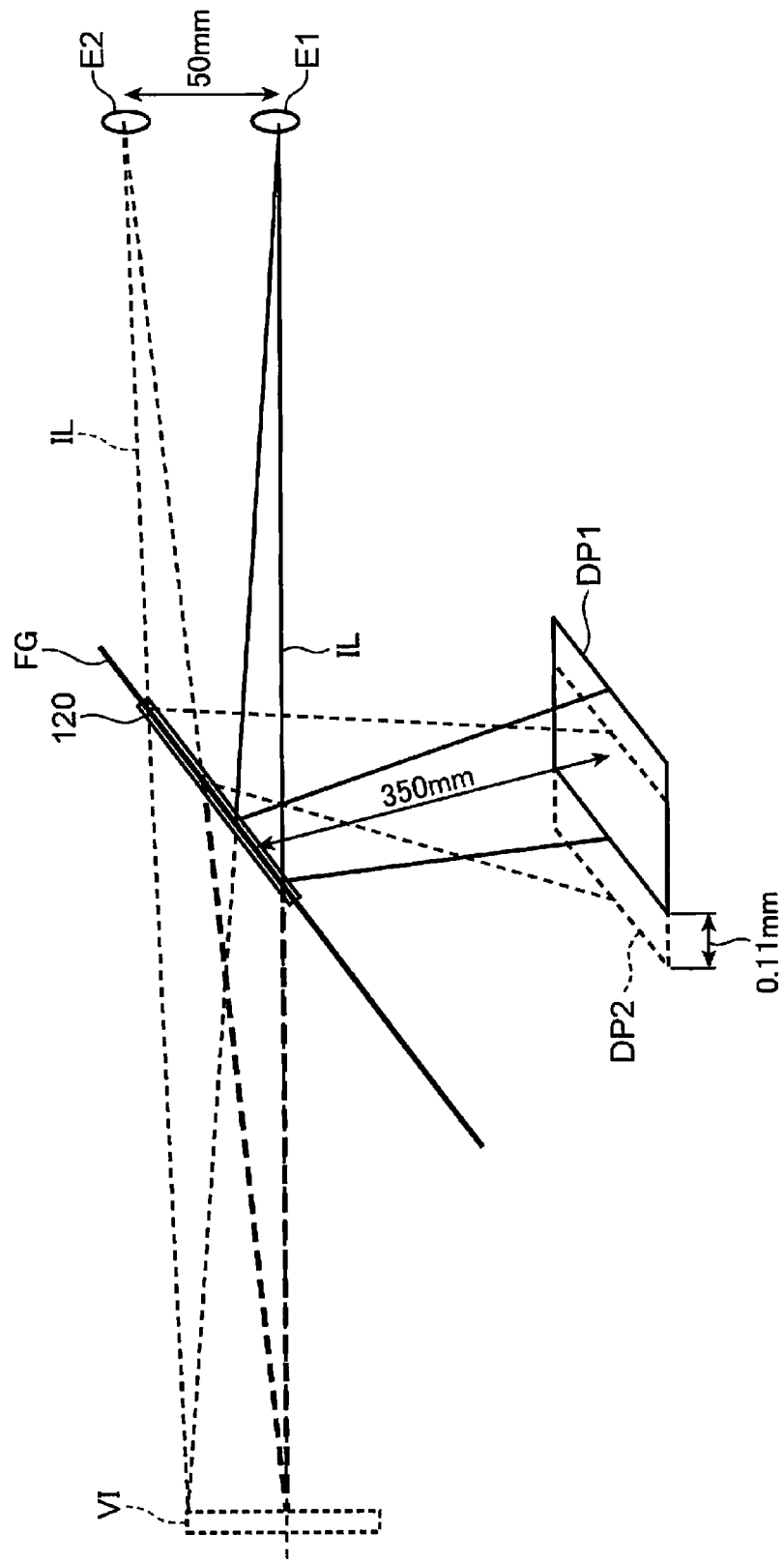

IMAGE DISPLAY DEVICE

TECHNICAL FIELD

The present invention is related to an image display device for forming an image by means of a laser beam generated by a laser source.

BACKGROUND OF THE INVENTION

There are various proposed image display devices configured to display an image by means of laser beams generated by laser sources such as laser diodes. An electronic printing device (laser printer or copier), which scans a beam to form an image, is exemplified as the image display device. A photoplotter, which directly irradiates recording paper with red, green and blue laser beams to burn-in a photo, is exemplified as another image display device. A projector, which irradiates a screen, instead of the aforementioned recording paper, with red, green and blue laser beams in order to display an image, is exemplified as yet another image display device. Another projector, which is used as an image display device, irradiates a two-dimensional modulator such as an ultra-small liquid crystal element or digital mirror device to display an image.

Semiconductor laser diodes (LD) and semiconductor light emitting diodes (LED) are exemplified as laser sources used for the aforementioned various image display devices. It is known that temperature rises of light emitting elements such as semiconductor laser diodes (LD) and semiconductor light emitting diodes (LED) shift the central wavelength of the emission spectrum toward a longer wavelength range or change the spectrum shape itself. It is also known that specific semiconductor laser sources and light emitting diodes change the central wavelength or spectrum shape in response to the input current value.

Patent Document 1 discloses an LED drive method for suppressing the emission spectrum variations during adjusting LED brightness of the projector. According to Patent Document 1, several light quantity control modes are switched in response to analysis results about color components of image signals.

Patent Document 2 discloses a method for preventing the temperature rise of the light source from shifting the central wavelength of the emission spectrum to a long wavelength range. According to Patent Document 2, the light source is pulse-modulated. A ratio of a turn-on period to a turn-off period of the laser source is adjusted to suppress the temperature rise of the light source. As a result, it becomes less likely to shift the wavelength.

Patent Document 3 discloses a head-mounted display provided with a hologram mirror. The disclosed technologies in Patent Document 3 aim to decrease variations in diffraction efficiency and diffraction angle of the hologram mirror, which are caused by the wavelength shift that is induced by temperature changes of the laser source. Patent Document 3 teaches a method for dissipating heat from the light source to maintain a constant temperature of the laser source and a method for providing several different light sources in the central wavelength.

The disclosed technologies in the aforementioned Patent Documents 1 and 2 contain problems about control under actual usage conditions. Under the actual usage conditions, the wavelength shifts caused by temperature variations go along with input power variations. Therefore, it is difficult to suppress variations in the emission spectrum and prevent the central wavelength of the emission spectrum from shifting.

Variations in the current supplied to a laser source with a narrow spectrum band may widen the spectrum band. Therefore, it has not been verified whether or not only the wavelength shift caused by temperature is compensated by the input current.

Variations in wavelength shift may not be suppressed only by the temperature control of the light source suggested in the technologies disclosed in Patent Document 3. In addition, the disclosed technologies in Patent Document 3 require several different light sources in the central wavelength of the emission spectrum. Therefore, the disclosed technologies in Patent Document 3 are also problematic in terms of cost.

Patent Document 1: JP 2008-102442 A
Patent Document 2: JP 2009-99701 A
Patent Document 3: JP 2007-226190 A

DISCLOSURE OF THE INVENTION

It is an object of the present invention to provide an image display device for displaying quality images.

An image display device according to one aspect of the present invention is provided with a laser source configured to emit a laser beam; an image forming element which uses the laser beam to emit image light for displaying an image; a first diffraction element configured to diffract the image light; and a controller configured to control a display position of the image in response to a wavelength of the laser beam and a temperature of the first diffraction element.

BRIEF DESCRIPTION OF THE DRAWINGS

FIG. 11 is a schematic view representing a method for adjusting an image display position for a driver's eye position.

DETAILED DESCRIPTION OF THE INVENTION

Figure 1:
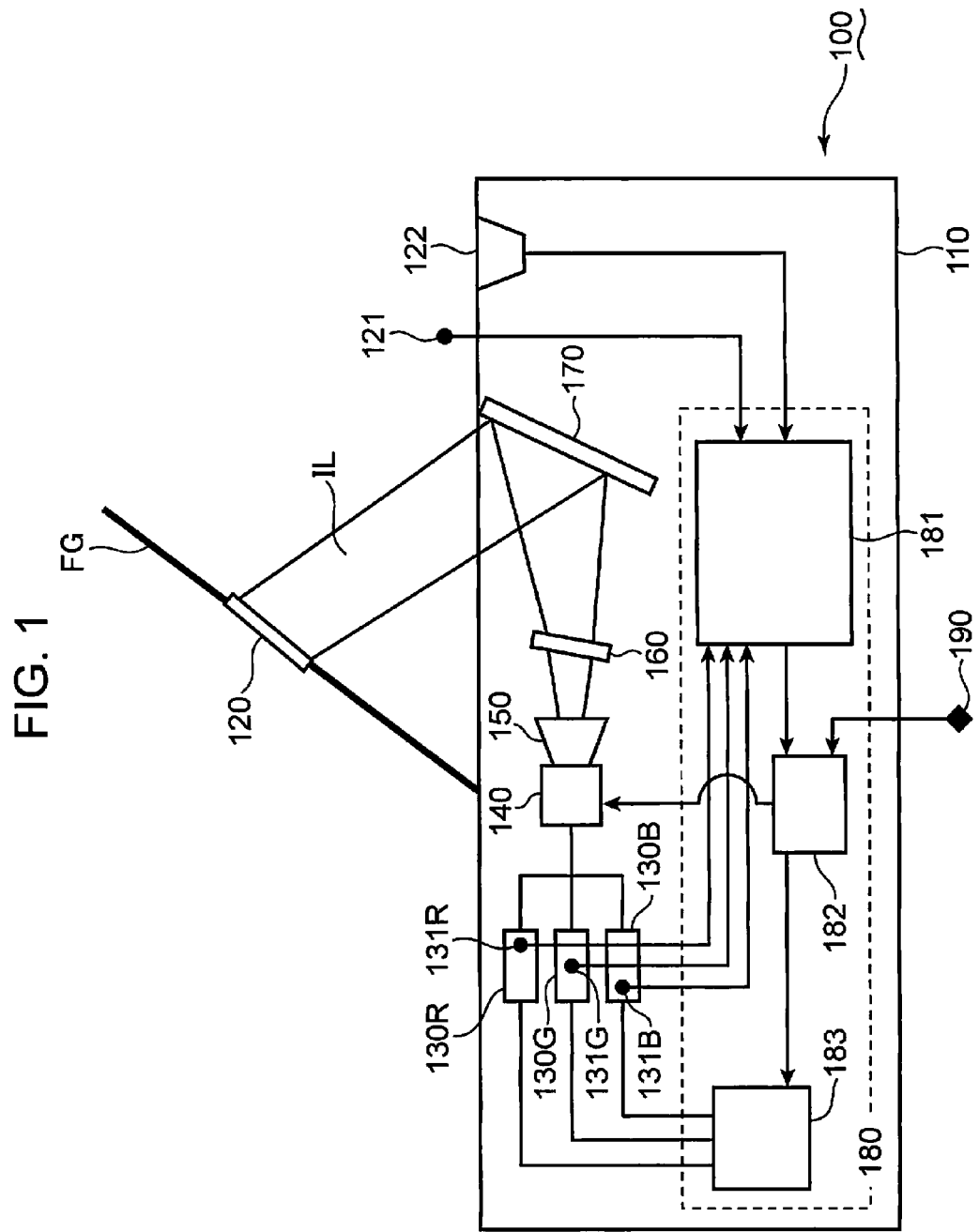
FIG. 1 is a schematic view of an internal structure of a head-up display device exemplified as the image display device according to the first embodiment.

The image display device according to one embodiment of the present invention is described hereinafter with reference to the drawings. In the drawings, constituent elements performing the same or similar operations or actions are assigned with the same reference symbols. Duplicate descriptions are omitted as appropriate to avoid redundancy. The constituent elements shown in the drawings are schematically depicted for facilitating to understand principles of a series of the embodiments. Therefore, shapes of the constituent elements shown in the drawings are also schematic. Thus it should be understood that the shapes do not limit the principles of the following embodiments.

(General Head-Up Display Device)

Figure 13:
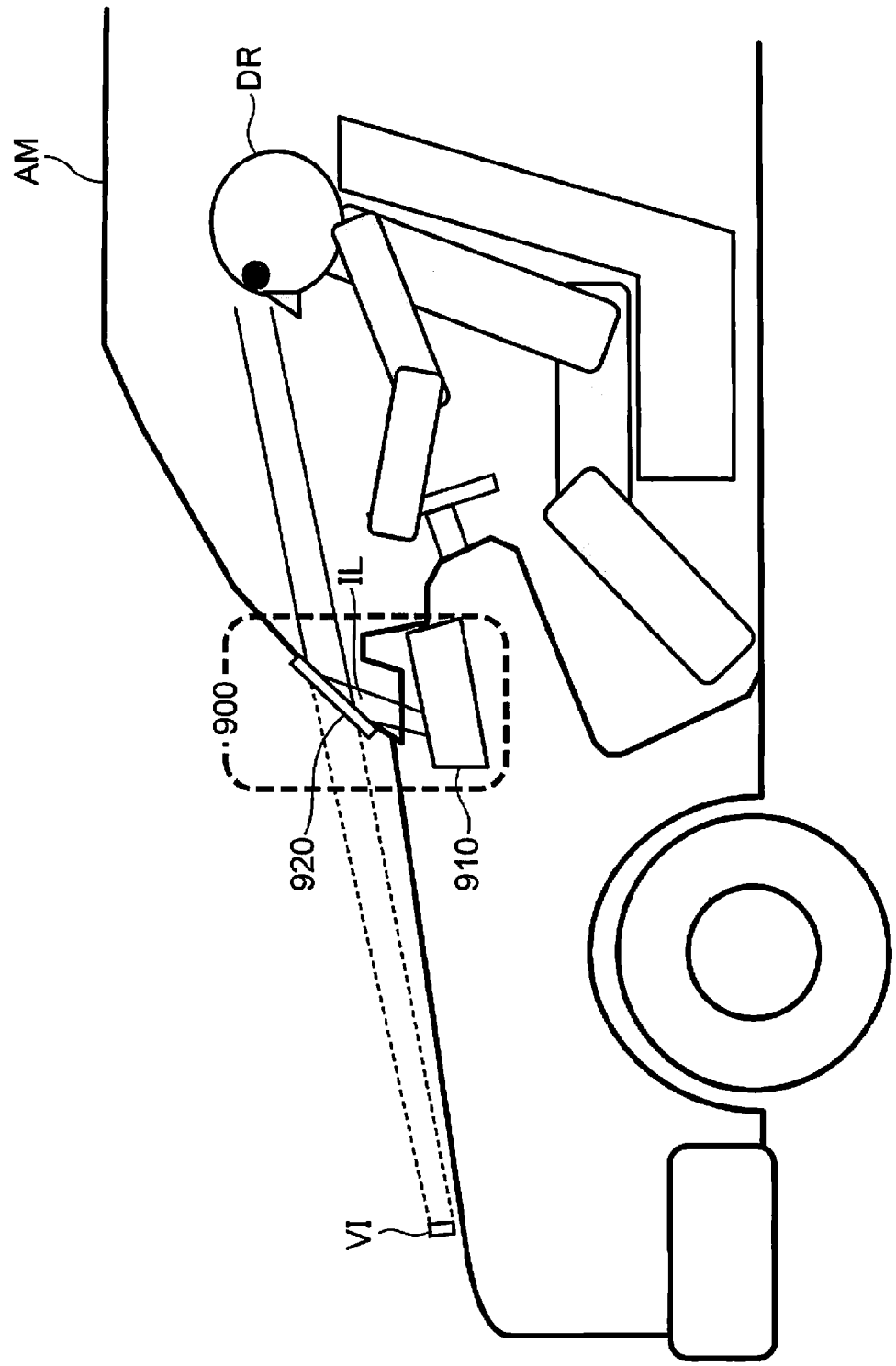
FIG. 13 is a schematic view of a head-up display device mounted on a vehicle.
Figure 14:
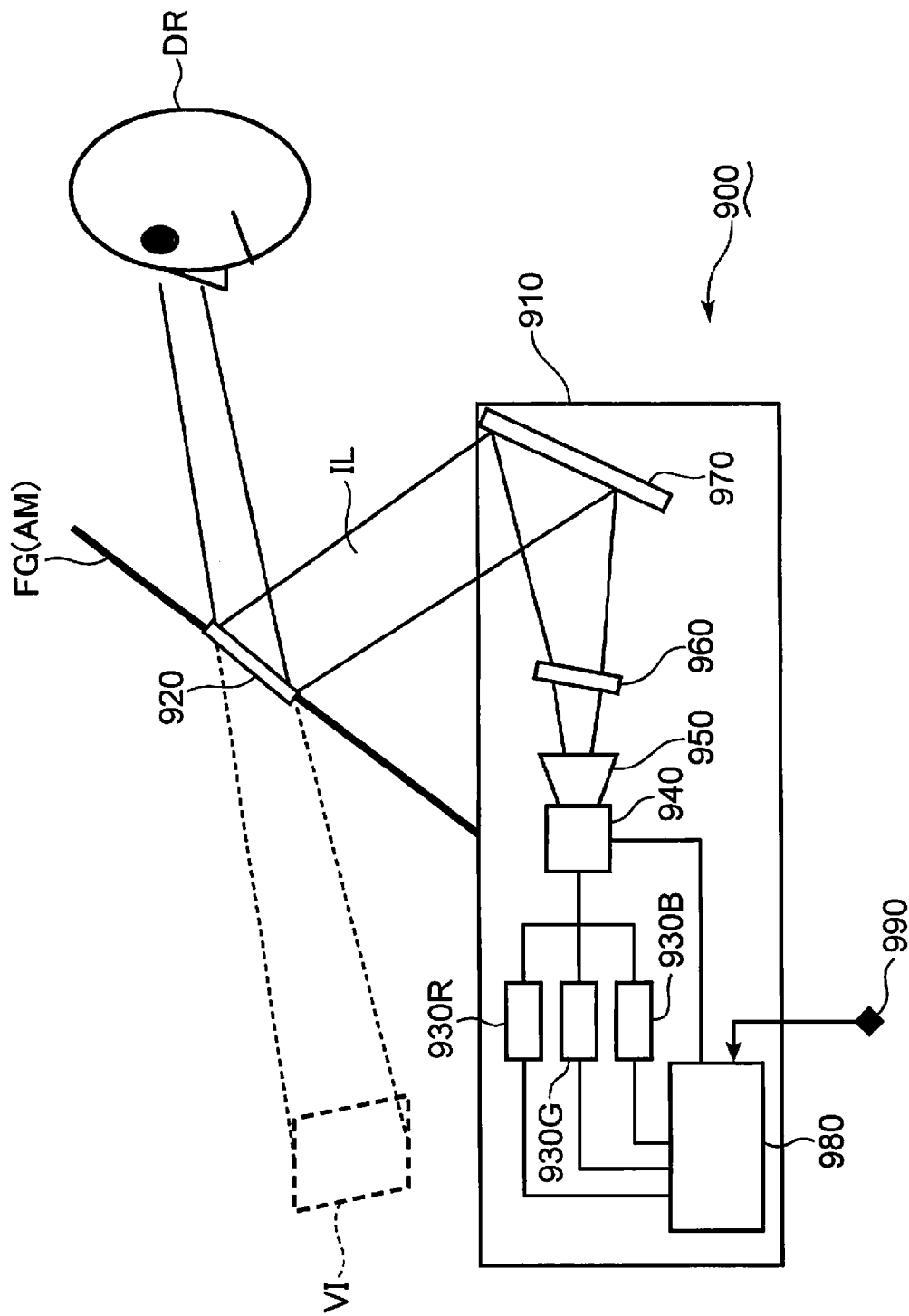
FIG. 14 is a schematic view of an internal structure of the head-up display device shown in FIG. 13.

FIG. 13 is a schematic view of a head-up display device mounted on a vehicle. FIG. 14 is a schematic view of an interior of the head-up display device shown in FIG. 13. A typical head-up display device with a hologram optical element is described with reference to FIGS. 13 and 14. In the series of the following embodiments, the head-up display device is exemplified as the image display device. The principles of the series of the following embodiments are also applicable to other devices configured to display images.

FIG. 13 shows a vehicle AM and a head-up display device 900 mounted on the vehicle AM. In FIG. 13, the head-up display device 900 is shown in a rectangular frame drawn by a dot line.

The head-up display device 900 is provided with a main body 910 which emits image light IL and a hologram mirror 920. The vehicle AM is provided with a windshield FG in front of a driver DR. The hologram mirror 920 (hologram optical element) is attached to the windshield FG. The image light IL emitted from the main body 910 is reflected by the hologram mirror 920 toward the driver DR, so that the image light IL reaches the driver DR. The driver DR perceives the image formed by the image light IL as a virtual image VI in front of the windshield FG.

As shown in FIG. 14, the main body 910 of the head-up display device 900 is provided with laser sources 930R, 930G, 930B. The laser source 930R emits a red laser beam. The laser source 930G emits a green laser beam. The laser source 930B emits a blue laser beam.

The head-up display device 900 is further provided with an image forming unit 940 (two-dimensional modulator) which forms an image by means of the laser beams from the laser sources 930R, 930G, 930B. A device such as a small liquid crystal panel or digital mirror device (DMD) is exemplified as the image forming unit 940.

The head-up display device 900 further comprises a projection lens 950 and an intermediate screen 960. The projection lens 950 projects the image light IL generated by the image forming unit 940 onto the intermediate screen 960.

The head-up display device 900 is further provided with a return mirror 970. The image light IL passing through the intermediate screen 960 is reflected by the return mirror 970 toward the aforementioned hologram mirror 920.

The head-up display device 900 is further provided with a controller 980 and an input port 990 into which video signals are input. The controller 980 controls the laser sources 930R, 930G, 930B and the image forming unit 940 in response to the video signals input to the input port 990.

The laser beams emitted from the laser sources 930R, 930G, 930B are multiplexed and shaped by means of an appropriate optical system, so that the image forming unit 940 is irradiated with the laser beams. The image forming unit 940 generates and emits an image (image light IL) to the projection lens 950 under the control of the controller 980. The image light IL from the projection lens 950 enters to the intermediate screen 960, so that an image corresponding to the image signals is projected and formed on the intermediate screen 960.

Image data representing the image displayed by the head-up display device 900 are input as electric signals to the input port 990. The controller 980 converts the electric signals (image data) input to the input port 990 into drive signals for driving the image forming unit 940. Afterward, the controller 980 outputs the drive signals to the image forming unit 940. The controller 980 generates timing signals to adjust a turn-on timing of the laser sources 930R, 930G, 930B in response to the electric signals (image data) input to the input port 990. The controller 980 supplies necessary currents for the laser sources 930R, 930G, 930B in response to the timing signals, respectively, to turn on the laser sources 930R, 930G, 930B.

The aforementioned head-up display device 900 with reference to FIGS. 13 and 14 is sensitive to variations in an ambient temperature. For example, characteristics of the laser sources 930R, 930G, 930B, hologram mirror 920 and an electric circuit which processes the image data in the controller 980 change in response to the variations in the ambient temperature.

Variations in temperatures of the laser sources 930R, 930G, 930B shift a wavelength of the emitted laser beam. The shifted wavelength of the laser beams is unsuitable in terms of the diffraction characteristics of the hologram mirror 920. As a result, image resolution or brightness is degraded, which results in much less quality image displayed.

A temperature around the image display device is affected not only by temperature variations in the usage environment of the image display device, but also by the internal temperature of the image display device, which increases with an operating time of the image display device. Therefore, the temperature around the image display device changes from moment to moment.

The disclosed technologies in Patent Document 3 are effective only for suppressing the temperature rise of the laser. Therefore, the disclosed technologies in Patent Document 3 are not directed to synchronization between variations in characteristics of the hologram mirror and the laser.

The present inventors have figured out that the degradation of the image quality is caused by absence of control which allows instantaneous response to changes in characteristics from moment to moment such as the temperature variations of the laser source and the hologram mirror in use. This fact is observed particularly if an image display device is used under severe conditions such as outdoor use or use on a vehicle. The problem about the image degradation is, however, encountered even under usual usage conditions of the image display devices if the image display device is used for more than several minutes. The present inventors have newly figured out a problem that the usage conditions of the image display device provided with laser sources and diffraction elements such as hologram elements were restricted due to the aforementioned fact. The principles of the series of the following embodiments preferably resolve the above problems associated with general image forming devices.

First Embodiment

In the first embodiment, a head-up display device is exemplified as the image display device. According to the principles of the first embodiment, a temperature of a hologram optical element is predicted in response to the temperature around the hologram optical element and a quantity of external light falling around the hologram optical element. The temperatures of laser sources are monitored to predict the central wavelengths of the laser beams emitted from the laser sources. A suitable diffraction angle at which a diffraction efficiency of the hologram optical element becomes the highest is calculated in response to the predicted temperature of the hologram optical element and the predicted central wavelength of the laser beam. A display position of the image formed by the image forming unit is adjusted in response to the calculated value of the diffraction angle, so that a driver perceives little degradation of the viewed image.

FIG. 1 is a schematic view of an interior of the head-up display device exemplified as the image display device according to the first embodiment. The head-up display device according to the first embodiment is described with reference to FIG. 1.

The head-up display device 100 is provided with a main body 110 which emits image light IL and a hologram mirror 120 which is attached to a windshield FG. The hologram mirror 120 diffracts the image light IL toward a driver driving a vehicle. In the present embodiment, the hologram mirror 120 is exemplified as the first diffraction element.

The main body 110 comprises laser sources 130R, 130G, 130B. The laser source 130R emits a red laser beam. The laser source 130G emits a green laser beam. The laser source 130B emits a blue laser beam. One of the laser sources 130R, 130G, 130B is exemplified as the first laser source and the other is exemplified as the second laser source in the present embodiment. The laser beam emitted from the laser source, which is exemplified as the first laser source, is exemplified as the first laser beam. The hue of the laser beam emitted from the laser source, which is exemplified as the first laser source, is exemplified as the first hue. The laser beam emitted from the laser source, which is exemplified as the second laser source, is exemplified as the second laser beam. The hue of the laser beam emitted from the laser source, which is exemplified as the second laser source, is exemplified as the second hue.

The main body 110 is further provided with an image forming unit 140 (two-dimensional modulator) configured to form an image by means of the laser beams from the laser sources 130R, 130G, 130B. A device such as a small liquid crystal panel or digital mirror device (DMD) is exemplified as the image forming unit 140. The image forming unit 140 emits the image light IL to display the image by means of the laser beams from the laser sources 130R, 130G, 130B. The image forming unit 140 is exemplified as the image forming element in the present embodiment.

The main body 110 is further provided with a projection lens 150 and an intermediate screen 160. The projection lens 150 projects the image light IL generated by the aforementioned image forming unit 140 onto the intermediate screen 160.

The main body 110 further comprises a return mirror 170. The image light IL passing through the intermediate screen 160 is reflected by the return mirror 170 to the hologram mirror 120.

The main body 110 is further provided with a controller 180 and an input port 190 into which video signals are input. The controller 180 controls the laser sources 130R, 130G, 130B and the image forming unit 140 in response to the video signals input to the input port 190. The control performed by the controller 180 is described below.

The laser beams emitted from the laser sources 130R, 130G, 130B are multiplexed and shaped by an appropriate optical system, and the image forming unit 140 is then irradiated with the laser beams. The image forming unit 140 generates and emits an image (image light IL) to the projection lens 150 under the control of the controller 180. The image light IL emitted from the projection lens 150 enters to the intermediate screen 160. Thus, an image corresponding to the image signals is projected and formed on the intermediate screen 160.

Image data representing the image displayed by the head-up display device 100 are input as electric signals to the input port 190. The controller 180 converts the electric signals (image data) input to the input port 190 into drive signals to drive the image forming unit 140. The controller 180 afterward outputs the drive signals to the image forming unit 140. The controller 180 generates timing signals for adjusting turn-on timings of the laser sources 130R, 130G, 130B in response to the electric signals (image data) input to the input port 190. The controller 180 supplies necessary currents for the laser sources 130R, 130G, 130B in response to the timing signals, respectively, to turn on the laser sources 130R, 130G, 130B.

The main body 110 further comprises first thermometers 131R, 131G, 131B which measures the temperatures of the laser sources 130R, 130G, 130B, respectively. The first thermometer 131R detects the temperature of the laser source 130R. The first thermometer 131G detects the temperature of the laser source 130G. The first thermometer 131B measures the temperature of the laser source 130B. The first temperature data corresponding to the measured temperatures of the laser sources 130R, 130G, 130B is output from the first thermometers 131R, 131G, 131B to the controller 180. The first thermometers 131R, 131G, 131B detect the temperatures of the laser sources 130R, 130G, 130B themselves. Alternatively, the first thermometers may measure temperatures around the laser sources. Further alternatively, the first thermometers may measure the temperatures of the laser sources themselves as well as the temperatures around the laser sources. The "temperature around the laser source" means a temperature which is measured in an area close to the laser source enough to predict a change (shift) in the wavelength of the laser beam caused by temperature variations. For example, the temperature around the laser source may be a temperature in a space within a range of 10 cm or 20 cm from the laser source.

The head-up display device 100 further comprises a second thermometer 121 which measures a temperature inside the vehicle cabin. The second thermometer 121 is used to measure a temperature around the hologram mirror 120. The second thermometer 121 outputs second temperature data to the controller 180 in response to the temperature around the hologram mirror 120. The "temperature around the hologram mirror" means a temperature which is measured in an area close to the hologram mirror enough to predict a change in the diffraction characteristics of the hologram mirror caused by temperature variations. For example, the temperature around the hologram mirror may be a temperature in a space within a range of 10 cm or 20 cm from the hologram mirror.

The head-up display device 100 is further provided with a photometer 122 which measures a quantity of external light falling into the vehicle cabin. The photometer 122 is used to measure a quantity of the external light falling around the hologram mirror 120. The photometer 122 generates and outputs light quantity data in response to the measured quantity of the external light to the controller 180. The "quantity of light falling around the hologram mirror" means a quantity of the external light falling onto a range which is close to the hologram mirror enough to estimate an influence from the external light falling onto the hologram mirror itself on variations in the hologram mirror temperature. For example, the light quantity falling around the hologram mirror may be a quantity of the external light falling in a space within a range of 10 cm to 20 cm from the hologram mirror.

The controller 180 comprises a position controller 181 which controls the display position of the image. The output data of the first thermometers 131R, 131G, 131B, second thermometer 121 and photometer 122 are input to the position controller 181. The position controller 181 may estimate the wavelength shifts of the red, green and blue laser beams emitted from the laser sources 130R, 130G, 130B in response to the first temperature data from the first thermometers 131R, 131G, 131B, respectively. The position controller 181 may estimate changes in the diffraction characteristics caused by variations in the temperature of the hologram mirror 120 in response to the second temperature data from the second thermometer 121 and the photometric data from the photometer 122. Thus, the position controller 181 may control the display positions of the red, green and blue images which are rendered by the red, green and blue laser beams emitted from the laser sources 130R, 130G, 130B, respectively, in response to the first temperature data, which are associated with the wavelengths of the laser beams, and also the second temperature data and photometric data, which are associated with the temperature of the hologram mirror 120. In the present embodiment, one of the red, green and blue images is exemplified as the first image and the other is exemplified as the second image.

The controller 180 is also provided with an image signal processor 182 configured to process the image signals input to the input port 190. The aforementioned position controller 181 determines shift amounts of the red, green and blue images, respectively, to generate shift information about the shift amounts in response to the first temperature data, second temperature data and photometric data. The shift information about the shift data for the red, green and blue images is input to the image signal processor 182. In the present embodiment, the shift information corresponding to the image, which is exemplified as the first image among the red, green and blue images, is exemplified as the first shift information. The shift information corresponding to the image, which is exemplified as the second image among the red, green and blue images, is exemplified as the second shift information. The position controller 181 is exemplified as the controller.

The image signal processor 182 drives the image forming unit 140 so that the positions of the red, green and blue images may be independently adjusted in response to the input shift information. In the present embodiment, the image signal processor 182 as well as the image forming unit 140 are exemplified as the image forming element.

The controller 180 is further provided with a drive power supply 183 which supplies power to the laser sources 130R, 130G, 130B. The image signal processor 182 generates the timing signals for adjusting the turn-on timings of the laser sources 130R, 130G, 130B in response to the image signals input to the input port 190. The timing signals are output to the drive power supply 183. The drive power supply 183 supplies the necessary currents in response to the timing signals in order to turn on the laser sources 130R, 130G, 130B. In the present embodiment, the drive power supply 183 is exemplified as the power supply.

If the laser sources 130R, 130G, 130B are turned on, an image represented by the red, green and blue images is formed in the image forming unit 140. As aforementioned, the display positions of the red, green and blue images are appropriately adjusted in response to the shift information.

Figure 2:
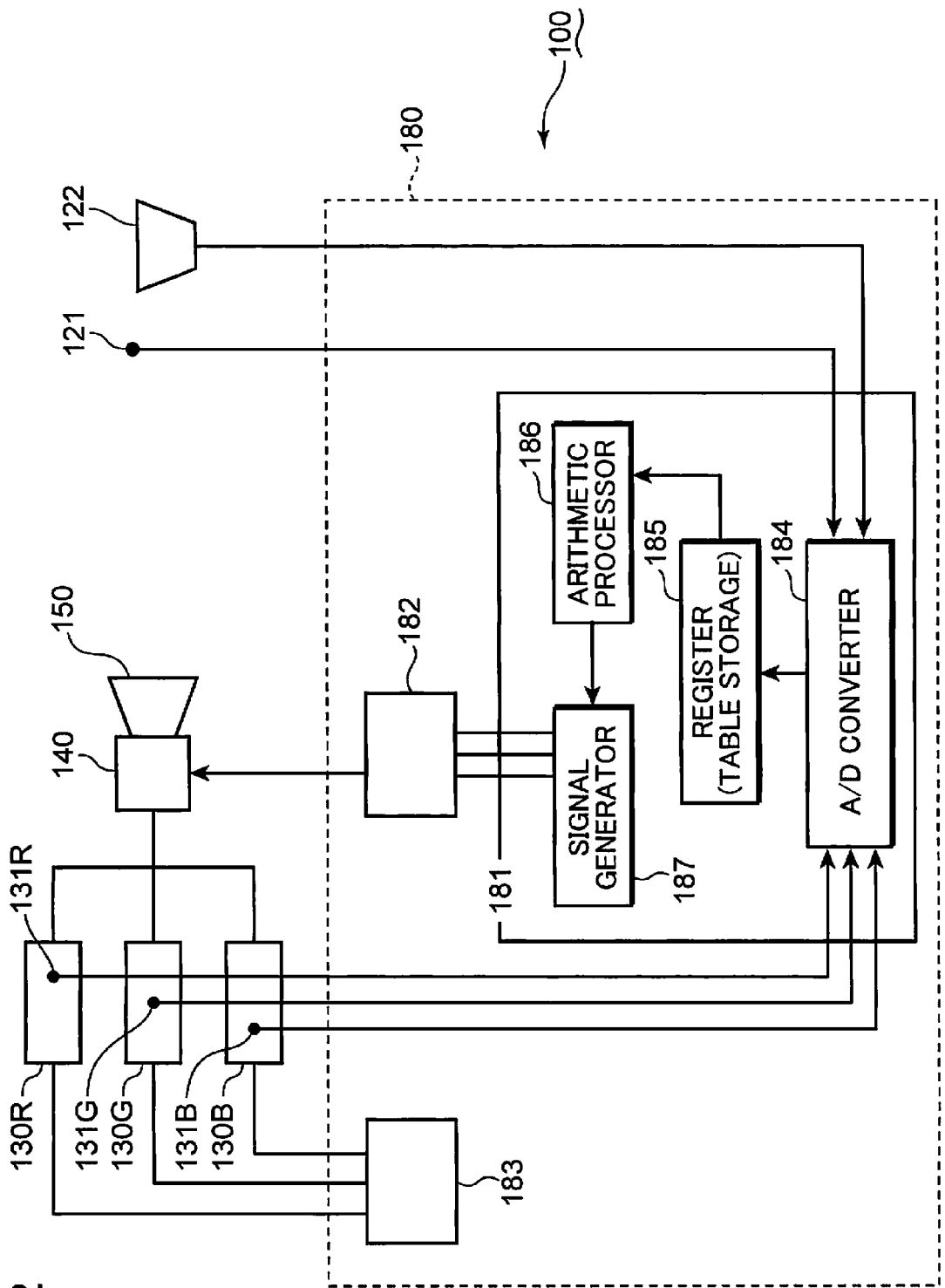
FIG. 2 is a block diagram schematically showing a configuration of a position controller of the head-up display device shown in FIG. 1.

FIG. 2 is a block diagram schematically showing a configuration of the position controller 181 which adjusts the shift amount for the display positions of the red, green and blue images. A method for determining the shift amount is described with reference to FIGS. 1 and 2.

The position controller 181 of the controller 180 is provided with an A/D converter 184. As aforementioned, the analog signals (first temperature data) representing the measured temperature of the laser sources 130R, 130G, 130B is output to the A/D converter 184 from the first thermometers 131R, 131G, 131B attached to the laser sources 130R, 130G, 130B, respectively, which are driven by the drive power supply 183. The analog signals (second temperature data) representing the temperature around the hologram mirror 120 is also output from the second thermometer 121 to the A/D converter 184. The analog signals (photometric data) representing a light quantity entering to the hologram mirror 120 is output from the photometer 122 to the A/D converter 184. The A/D converter 184 converts these analog signals into digital signals.

The position controller 181 is further provided with a register 185. The A/D controller 184 outputs the aforementioned digital signals to the register 185. The register 185 estimates wavelengths of the laser beams emitted by the laser sources 130R, 130G, 130B in response to the first temperature data. The register 185 also estimates the temperature of the hologram mirror 120 in response to the second temperature data and photometric data.

Central wavelengths of the laser beams emitted from the laser sources 130R, 130G, 130B at a certain temperature (for example, 25° C.) and the temperature variation rates of the central wavelengths are stored in advance in the register 185. For example, the register 185 stores the following information: the central wavelength of the blue laser beam emitted by the laser source 130B at a temperature of 25° C. is 450 nm and the temperature variation rate of the blue laser beam is 0.2 nm/° C. In this case, if the first temperature data from the first thermometer 131B represent a temperature of the laser source 130B at 40° C., the register 185 estimates the central wavelength of the blue laser beam from the laser source 130B as 453 nm.

A temperature rise amount of the hologram mirror 120 related to the quantity of the external light measured by the photometer 122 is stored in advance in the registered 185. The temperature rise amount is calculated by means of such parameters as absorbance or specific heat of the hologram mirror 120 which is related to a specific wavelength light. As a result, the temperature rise amount resulting from the light absorption by the hologram mirror 120 may be appropriately determined.

For example, the register 185 may store data about a correlation between a quantity of the external light detected by the photometer 122 and a quantity of the external light actually entering to the hologram mirror 120. The register 185 may estimate the quantity of the external light actually entering to the hologram mirror 120 in response to the quantity of the external light detected by the photometer 122. The register 185 may calculate thermal energy absorbed by the hologram mirror 120 in response to the quantity of the external light actually entering to the hologram mirror 120 and the light absorbance of the hologram mirror 120. The register 185 may multiply the calculated thermal energy by the specific heat of the hologram mirror 120 to estimate the temperature rise amount of the hologram mirror 120.

The hologram mirror 120 typically absorbs UV radiation with a wavelength, which is no more than 400 nm, or IR radiation with a wavelength, which is no less than 800 nm.

Therefore, the photometer 122 may be preferably provided with a measurement element configured to measure a light quantity within these wavelength bands.

The register 185 may estimate a sum of the calculated temperature rise amount of the hologram mirror 120 and the second temperature data obtained from the second thermometer 121 as the temperature of the hologram mirror 120.

The register 185 stores a table representing a relationship between the wavelengths of the red, green and blue laser beams emitted from the laser sources 130R, 130G, 130B, respectively, and the display position of the image formed by the image forming unit 140. In the present embodiment, the register 185 is exemplified as the memory.

The position controller 181 is provided with an arithmetic processor 186 configured to calculate a shift amount which is used for compensating changes in the image display position caused by variations in temperatures of the hologram mirror 120 and laser sources 130R, 130G, 130B. The arithmetic processor 186 may calculate the shift amount by means of the table stored in the register 185. In the present embodiment, the arithmetic processor 186 is exemplified as the generator.

The position controller 181 is further provided with a signal generator 187 which generates a signal to notify the image signal processor 182 of the shift amount in response to the shift information. The image signal processor 182 processes the image signals to drive and control the image forming unit 140 in response to the image signals from the input port 190 and the shift information from the signal generator 187. In the present embodiment, the signal generator 187 is exemplified as the output portion.

According to the principles of the first embodiment, the image display position is shifted in a predetermined direction in response to the central wavelengths of the laser beams emitted by the laser sources 130R, 130G, 130B and the diffraction angle of the hologram mirror 120, which changes in response to the ambient temperature. As a result, the driver driving the vehicle may view the image with little quality degradation such as color aberration.

Figure 3:
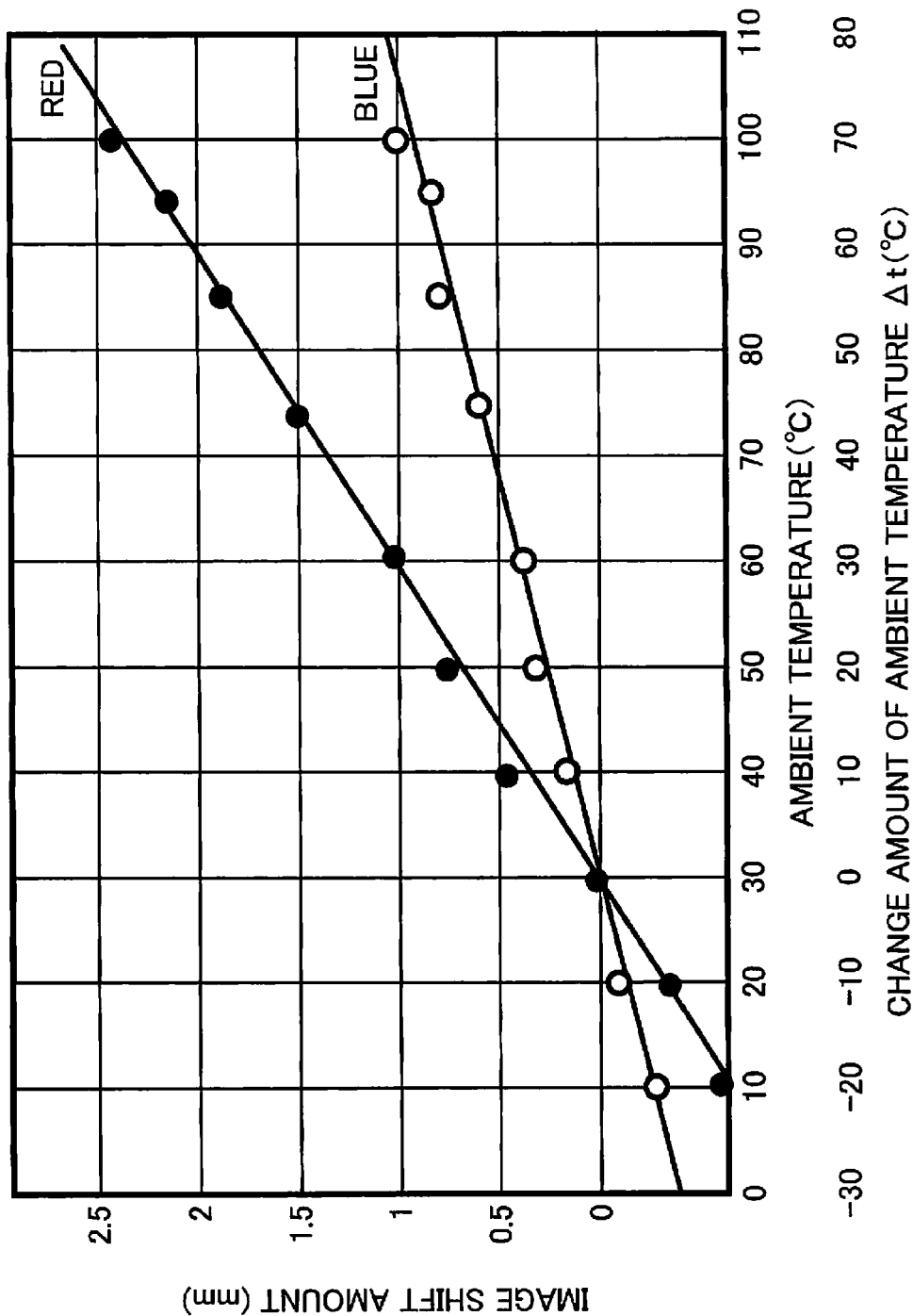
FIG. 3 is a schematic plot showing a relationship between an ambient temperature and a positional shift amount of the displayed image.

FIG. 3 is a schematic plot representing a relationship between the ambient temperature and the positional shift amount of a displayed image. The relationship between the ambient temperature and the positional shift amount of the displayed image is described with reference to FIGS. 1 and 3.

In the plot shown in FIG. 3, the ambient temperature and the temperature change amount ($\Delta t$) determined with reference to the ambient temperature of 30° C. are plotted on the abscissa. The changes (image shift amount) in the image display position in response to the changes in the ambient temperature are plotted against the ordinate in FIG. 3. The inventors changed the ambient temperature to study the display position changes of red and blue images rendered by means of a two-dimensional modulator as the image forming unit 140 and created the plot in FIG. 3.

The following characteristics are figured out from the plot shown in FIG. 3.

(1) The image display position linearly changes in response to the changes in the ambient temperature.

(2) The image display position shifts only in the vertical direction.

The inventors used a red semiconductor laser source, which primarily consisted of GaAs type materials, as the laser source 130R. The inventors used a blue semiconductor laser source, which primarily consisted of GaN type materials as the laser source 130B. The shift amount of the red image rendered by the red semiconductor laser source was different from the shift amount of the blue image rendered by the blue semiconductor laser source. However, since the shift amount of both images changes linearly, it was figured out that degradation of the image viewed by the driver may be suppressed if the shift amount is linearly corrected in response to the ambient temperature.

Figure 4:
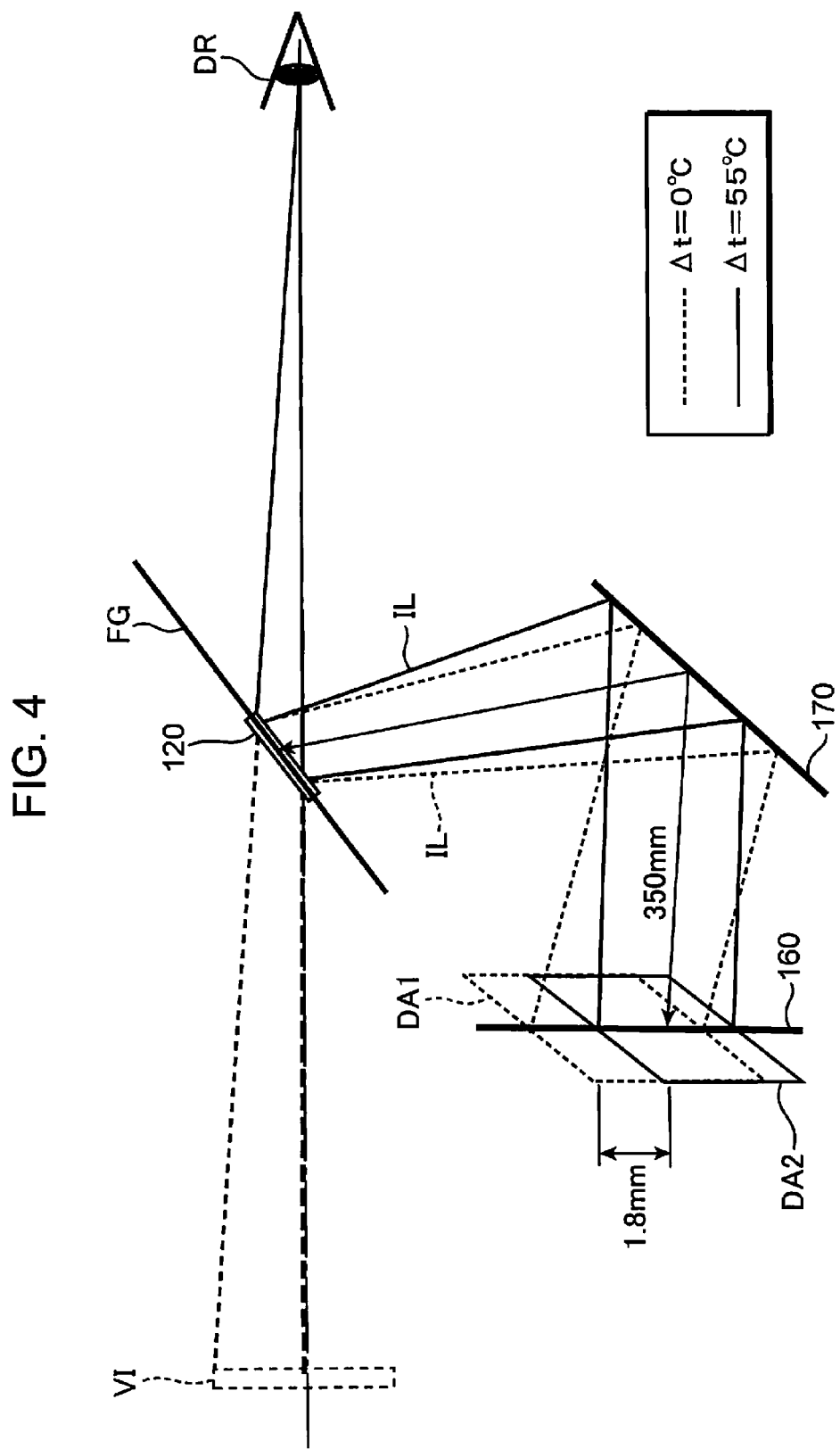
FIG. 4 is a schematic view showing a method for correcting a image display position.

FIG. 4 is a schematic view showing a method for correcting the image display position by means of the aforementioned relationship shown in FIG. 3. The correction of the image display position is described with reference to FIGS. 1 to 4.

In FIG. 4, the image light IL of the red image obtained under 0° C. of the temperature change amount is shown by a dot line. The image light IL of the red image obtained under 55° C. of the temperature change amount is shown by a solid line. The eye position of the driver DR in FIG. 4 is consistent.

The display position of the red image on the intermediate screen 160 under 0° C. of the temperature change amount is shown as the display area DA1 in FIG. 4. If the display area DA1 is irradiated with the red image rendered by the red laser beam from the laser source 130R under 0° C. of the temperature change amount, the image light IL reaches the eyes of the driver DR via the return mirror 170 and the hologram mirror 120. Thus, the driver DR views the virtual image VI in front of the windshield FG.

As shown in FIG. 3, if the change amount of the ambient temperature becomes 55° C., the red image shifts upward by about 1.8 mm. As described above with reference to FIGS. 1 and 2, the signal controller 181 outputs the shift information representing the shift amount of "1.8 mm" to the image signal processor 182. The image signal processor 182 then controls the image forming unit 140 so that the red image is displayed in the display area DA2, which is moved downward by 1.8 mm from the display area DA 1. Thus, the driver DR may view the virtual image VI at the same position as the virtual image VI under 0° C. of the temperature change amount. Unless the image display position is changed from the display area DA1 to the display area DA2, the driver DR perceives color aberration in the image (image quality degradation).

The temperature of the hologram mirror 120 may also rise if the hologram mirror 120 absorbs laser radiation entering to the hologram mirror 120. The temperature rise of the hologram mirror 120 caused by the absorption of the laser beams is less than the variations in the temperature of the hologram mirror 120 caused by the temperature around the hologram mirror 120 or the external light entering to the hologram mirror 120. However, the register 185 may preferably predict the temperature, which is higher by the increase in temperature resulting from the absorption of the laser beams than the temperature rise amount predicted in response to the temperature around the hologram mirror 120 and the quantity of the external light entering to the hologram mirror 120. As a result, it becomes less influential that the absorption of the laser beams increases the temperature of the hologram mirror 120, which results in highly accurate image position adjustment.

In particular, a quantity of the solar light falling on the windshield FG largely changes the temperature of the hologram mirror 120. Therefore, the second thermometer 121 and the photometer 122 are preferably mounted at positions where the solar light falling on the windshield FG is not cut off. For example, the second thermometer 121 and the photometer 122 may be mounted at a lower portion of the windshield FG or on the dashboard. If the second thermometer 121 and the photometer 122 are mounted in position, there is advantageously a decreased error from the actual temperature of the hologram mirror 120. The measurement portions of the second thermometer 121 and the photometer 122 may be inclined with respect to the windshield FG so that actual measurement planes of the second thermometer 121 and the photometer 122 becomes substantially perpendicular to the incidence direction of the solar light.

The second thermometer 121 measures a temperature around the hologram mirror 120 in the present embodiment. Alternatively, the temperature of the hologram mirror itself may be measured. Further alternatively, both of the temperature around the hologram mirror and the temperature of the hologram mirror itself may be measured.

In the present embodiment, the photometer 122 measures a quantity of the external light falling around the hologram mirror 120. Alternatively, the quantity of the external light entering to the hologram mirror itself may be measured. Further alternatively, both the quantity of the external light falling around the hologram mirror and the quantity of the external light entering to the hologram mirror may be measured.

Second Embodiment

In the second embodiment, the temperature of the hologram optical element is measured by a hologram pattern formed in a hologram optical element region, which does not contribute to image display. The temperature of the hologram optical element is determined in response to positions of laser beams diffracted by the hologram pattern formed for measuring the temperature in order to identify the shift amount of the displayed image.

Figure 5:
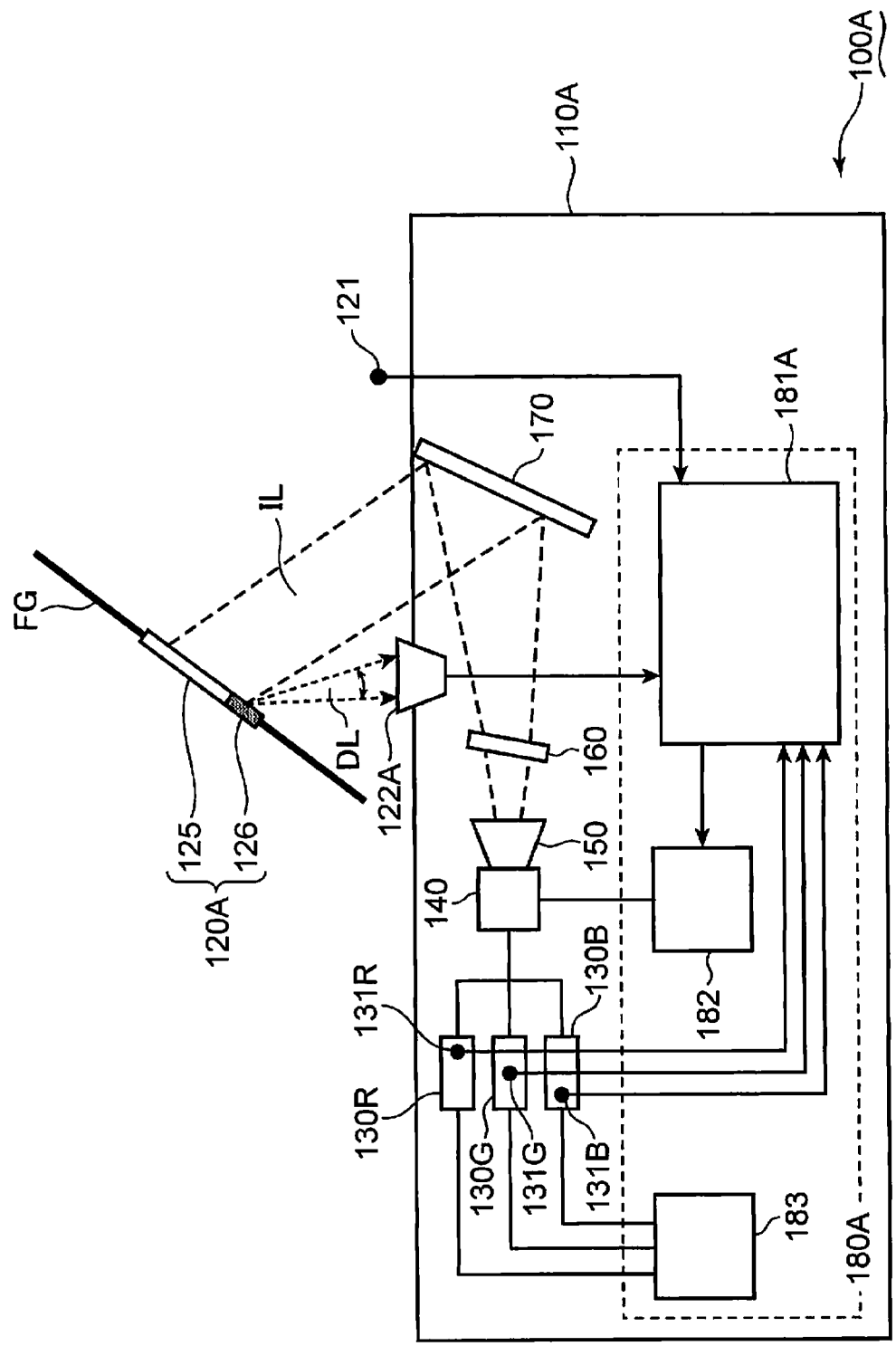
FIG. 5 is a schematic view of a head-up display device exemplified as the image display device according to the second embodiment.

FIG. 5 is a schematic view of a head-up display device exemplified as the image display device according to the second embodiment. The head-up display device according to the second embodiment is described with reference to FIG. 5.

The head-up display device 100A according to the present embodiment is provided with a hologram optical element 120A which is attached to the windshield FG and a main body 110A which emits image light IL onto the hologram optical element 120A. The hologram optical element 120A is provided with a first hologram 125 configured to diffract the image light IL so that the driver may view the image, and a second hologram 126 used to measure the temperature of the hologram optical element 120A. The second hologram 126 is situated beside the first hologram 125. In the present embodiment, the first hologram 125 is exemplified as the first diffraction element.

Like the main body 110 described in the context of the first embodiment, the main body 110A is provided with the laser sources 130R, 130G, 130B, the image forming unit 140, the projection lens 150, the intermediate screen 160, the return mirror 170, and the first thermometers 131R, 131G, 131B. Like the head-up display device 100 described in the context of the first embodiment, the head-up display device 100A is further provided with the second thermometer 121.

The image light IL emitted from the main body 110A partially enters to the second hologram 126. The second hologram 126 diffracts the part of the image light IL. The head-up display device 100A is further provided with an optical receiver 122A, which receives the diffraction light DL diffracted by the second hologram 126, and a controller 180A.

Unlike the first hologram 125 for diffracting the image light IL to the driver, the second hologram 126 diffracts the part of the image light IL to the optical receiver 122A. The second hologram 126 varies the diffraction direction in response to the temperature of the second hologram 126. The optical receiver 122A outputs diffraction position data including information about a reception position of the diffraction light DL. The second thermometer 121 outputs internal temperature data including information about the temperature inside the vehicle cabin. The diffraction position data and the internal temperature data are exemplified as the second temperature data in the present embodiment. The second hologram 126 is exemplified as the second diffraction element. The optical receiver 122A is exemplified as the light receiving element.

The controller 180A is provided with a position controller 181A. The first temperature data from the first thermometers 131R, 131G, 131B, the internal temperature data from the second thermometer 121, and the diffraction position data from the optical receiver 122A are input to the position controller 181A. The position controller 181A estimates wavelengths of the laser beams emitted from the laser sources 130R, 130G, 130B in response to the first temperature data. The position controller 181A also estimates a temperature of the hologram optical element 120A in response to the internal temperature data and diffraction position data.

The temperature of the hologram optical element 120A is appropriately estimated without a thermometer directly attached to the hologram optical element 120A according to the principles of the present embodiment. The diffraction position data more accurately represent effects on the diffraction angle of the hologram optical element 120A, which are caused by the temperature variations of the hologram optical element 120A, than the actually measured temperature of the hologram optical element 120A. Since the temperature characteristics about the diffraction angle of the hologram optical element 120A are accurately identified, the position of the displayed image may be accurately controlled.

The head-up display device 100A according to the present embodiment is mounted on the vehicle. Therefore, the hologram optical element 120A is attached to the windshield FG of the vehicle. As described above, since a thermometer for measuring the temperature of the hologram optical element 120A is not required, it is unnecessary to place a wire for the thermometer, which interferes with the driver's field of view. Therefore, the head-up display device 100A according to the present embodiment may be advantageously used for a vehicle.

Like the controller 180 described in the context of the first embodiment, the controller 180A is further provided with the image signal processor 182 and the drive power supply 183. The signal controller 181A outputs the shift information about a shift amount of the image display position to the image signal processor 182 in response to the first temperature data, the diffraction position data and the internal temperature data. The image signal processor 182 controls and drives the image forming unit 140 in response to the shift information and the image signals.

The position controller 181A may generate control signals to control the drive power supply 183. The drive power supply 183 outputs current signals to the laser sources 130R, 130G, 130B in response to the control signals. As a result, the laser sources 130R, 130G, 130B are turned on in response to the image signals.

The head-up display device 100A may be provided with an optical filter attached to the optical receiver 122A. The optical filter preferably prevents the light with a wavelength other than the laser beam wavelengths emitted from the laser sources 130R, 130G, 130B from reaching the optical receiver 122A. If modulating light sources are used as the laser sources 130R, 130G, 130B, the laser beams generated by the light sources, which is driven by the modulated signal "(f)+Δf", are heterodyne-detected by the modulated signal (f) and the signal generated by the light, which is received by the optical receiver 122A. As a result, the external light becomes less influential on the image display position. Therefore, it becomes less likely to cause inappropriate control which may erroneously shifts the image display position in a direction to increase an image shift amount.

Figure 6:
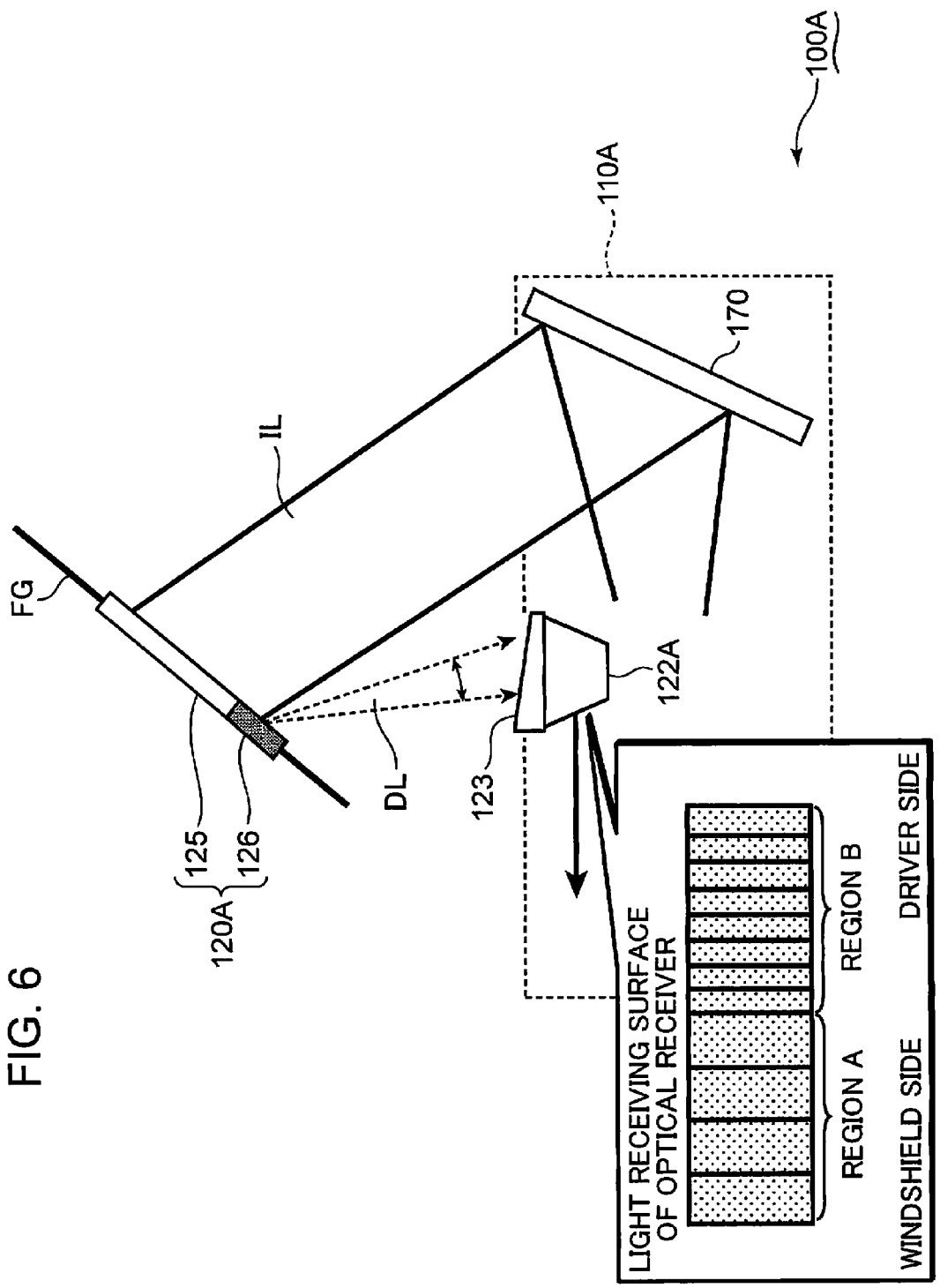
FIG. 6 is a schematic view showing temperature measurement of the hologram optical element by means of the second hologram in the head-up display device depicted in FIG. 5.

FIG. 6 schematically shows temperature measurement of the hologram optical element 120A by means of the second hologram 126. The temperature measurement of the hologram optical element 120A is described with reference to FIGS. 5 and 6.

A part of the image light IL, which the main body 110A emits to represent contents displayed for the driver, enters to the first hologram 125. In addition to the light part representing the contents displayed for the driver, the image light IL includes a part which does not represent the contents displayed for the driver (temperature measurement light). The temperature measurement light enters to the second hologram 126.

The second hologram 126 is different in diffraction angle from the first hologram 125 which is used to display the image for the driver. The second hologram 126 diffracts the image light IL toward the main body 110A without diffracting the image light IL toward the driver.

The direction of the diffraction light DL diffracted by the second hologram 126 depends on the oscillation wavelength of the laser sources 130R, 130G, 130B and the temperature of the second hologram 126. Therefore, the diffraction angle of the hologram optical element 120A may be detected by the direction of the diffraction angle DL substantially in real time.

Information representing a relationship between the temperature of the hologram optical element 120A and the incidence position of the diffraction light DL on the optical receiver 122A or the diffraction direction of the diffraction light DL is preferably stored in the position controller 181A in advance. A variation amount of the diffraction direction or an incidence position from the reference position, which is set on the optical receiver 122A, may be used as the information about the incidence position of the diffraction light DL or the diffraction direction of the diffraction light DL. Thus, if the optical receiver 122A detects the diffraction light DL, the position controller 181A may calculate a temperature of the hologram optical element 120A in response to the incidence position of the diffraction light DL on the optical receiver 122A or the diffraction direction of the diffraction light DL. Therefore, the temperature of the hologram optical element 120A is appropriately detected without direct measurements according to the principles of the present embodiment.

The head-up display device 100A preferably comprises a wedged filter 123 attached to the optical receiver 122A as shown in FIG. 6. Since the filter 123 has a wedged cross section, stray light is unlikely to occur. The filter 123 prevents the diffraction light DL from being reflected in unnecessary directions. Thus, it becomes less likely that erroneous information is provided to the driver. In addition to the suppression of the stray light, the filter 123 may also prevent light with wavelengths other than the laser beam wavelengths emitted from the laser sources 130R, 130G, 130B from reaching the optical receiver 122A, like the aforementioned optical filter.

Figure 7:
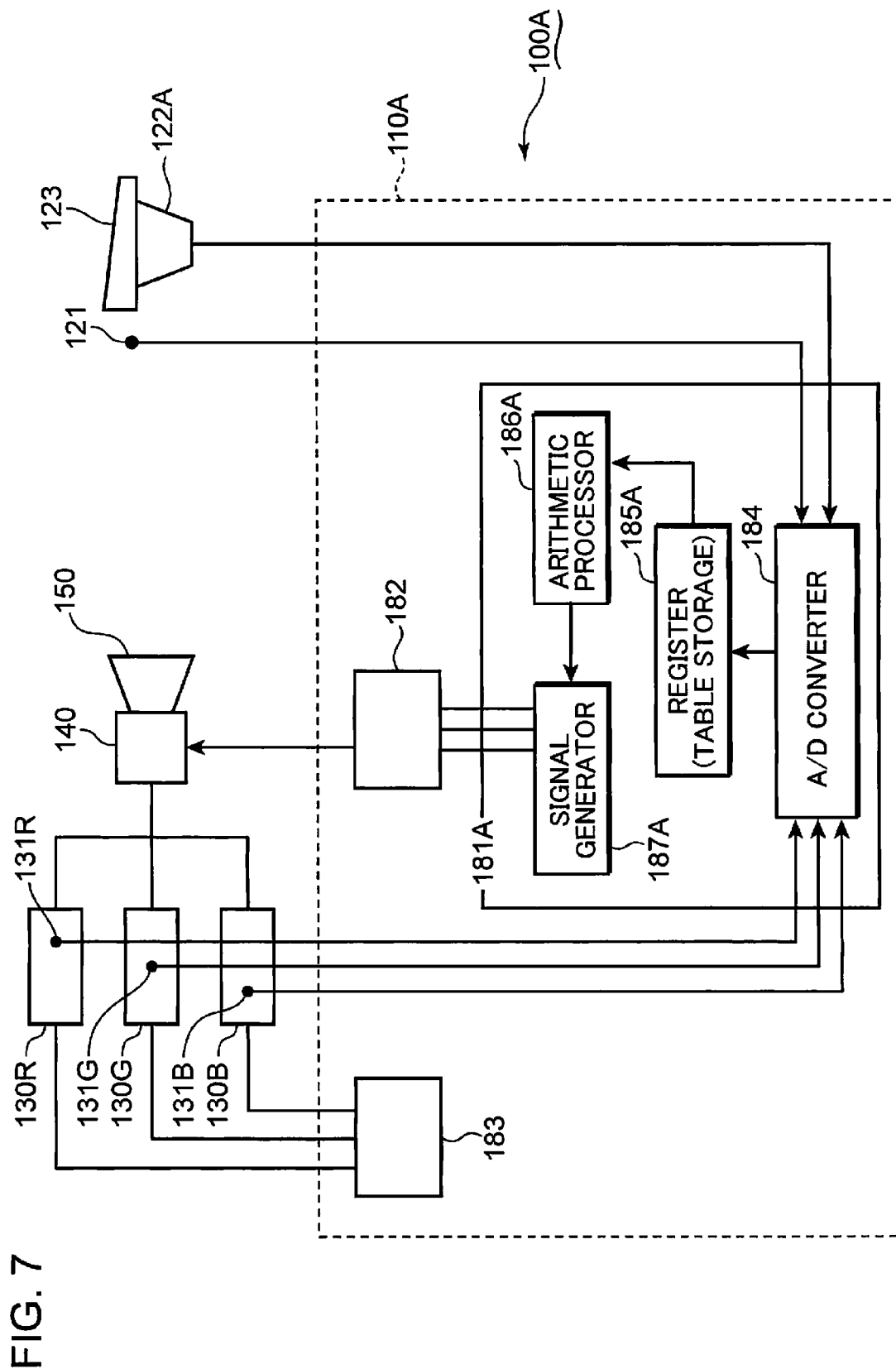
FIG. 7 is a block diagram schematically showing a configuration of a position controller of the head-up display device shown in FIG. 5.

FIG. 7 is a block diagram schematically showing a configuration of the position controller 181A, which adjusts a shift amount of display positions of the red, green and blue images. A method for determining the shift amount is described hereinafter with reference to FIGS. 6 and 7.

The position controller 181A of the controller 180A has the A/D converter 184. As aforementioned, the analog signals (first temperature data), which represents the measured temperatures of the laser sources 130R, 130G, 130B, are output to the A/D converter 184 from the first thermometers 131R, 131G, 131B attached to the laser sources 130R, 130G, 130B, respectively, which are driven by the drive power supply 183. The analog signals (internal temperature data), which show a temperature inside the vehicle cabin, are also output from the second thermometer 121 to the A/D converter 184. The analog signals (diffraction position data) representing an incidence position or a diffraction direction of the diffraction angle DL are output from the optical receiver 122A to the A/D converter 184. The A/D converter 184 converts these analog signals into digital signals.

The position controller 181A is provided with an arithmetic processor 186A configured to determine whether to change the image display position in response to the diffraction position data from the optical receiver 122A.

The position controller 181A further comprises a register 185A. The register 185A memorizes temperature characteristics of the oscillation wavelengths of the laser sources 130R, 130G, 130B and the hologram optical element 120A as a table. The register 185A may also store initial values of the oscillation wavelengths of the laser sources 130R, 130G, 130B or temperature characteristics corresponding to the subsequent changes in the oscillation wavelengths. If the register 185A stores these temperature characteristics, arithmetic processes for the control by means of the position controller 181A becomes speedy. Therefore, it becomes short to compensate the temperature variations in the diffraction angle of the hologram optical element 120A.

The register 185A stores information showing a relationship between the temperature of the hologram optical element 120A and the incidence position of the diffraction light DL on the optical receiver 122A or the diffraction direction of the diffraction light DL. The variation amount of the incidence position from the reference position, which is set for the optical receiver 122A, or the variation amount of the diffraction direction may be used as the information about the incidence position or the diffraction direction of the diffraction light DL.

The register 185A stores wavelength information about an optimum laser beam wavelength with respect to a temperature of the hologram optical element 120A. The arithmetic processor 186A calculates an optimum diffraction angle for the current temperature of the hologram optical element 120A in response to the wavelength information to output the shift information.

The position controller 181A is further provided with a signal generator 187A. The signal generator 187A generates a signal to notify the image signal processor 182 of the shift amount in response to the shift information from the arithmetic processor 186A. The image signal processor 182 processes the image signals to drive and control the image forming unit 140 in response to the image signals and the shift information from the signal generator 187A.

It should be noted that the register 185A may store information representing a relationship between diffraction characteristics of the diffraction light DL such as incidence positions or diffraction directions of the diffraction light DL on or to the optical receiver 122A and optimum wavelengths of the laser beam for the hologram optical element 120A.

The position controller 181A may output control signals to the drive power supply 183 to stop the current supply to the laser sources 130R, 130G, 130B unless the diffraction light DL enters to the optical receiver 122A or if a quantity of the diffraction light DL becomes less than a light quantity threshold, which is set for the quantity of diffraction light DL in advance. As a result, the main body 110A stops emitting the image light IL.

Due to the aforementioned stop function of the image light IL, for example, even if the vehicle, on which the head-up display device 100A is mounted, is damaged in an accident, since the power supply to the laser sources 130R, 130G, 130B is stopped, the laser beams are not emitted outside the head-up display device 100. As a result, it becomes less likely that the laser beams are emitted to unintended locations. The light quantity threshold may be set in the position controller 181A as appropriate. For example, the light quantity threshold may be set to a value, which is no less than a light quantity that is detected by the optical receiver 122A while the head-up display device 100A is not driven (i.e., during absence of the laser beam emission from the laser sources 130R, 130G, 130B). The upper limit of the light quantity threshold is determined as appropriate so that the power supply to the laser sources 130R, 130G, 130B is not unnecessarily interrupted if the head-up display device 100A normally operates.

As described with reference to FIG. 5, the temperature of the hologram optical element 120A is measured by means of the diffraction angle of the diffraction light DL from the second hologram 126 according to the principles of the present embodiment. Therefore, the optical receiver 122A includes several light receiving regions.

As described in the context of the first embodiment, if the image forming unit 140 is a two-dimensional modulator, the image display position shifts only in the vertical direction with changes in the ambient temperature. Therefore, the optical receiver 122A may be preferably a line sensor including several optical receivers aligned so as to detect the diffraction angle.

For example, the forming unit 140 may be a MEMS. In this case, the image forming unit 140 scans the laser beams over the hologram optical element 120A to form an image. Since the scanning angle of the MEMS itself is affected by a temperature, the optical receiver 122A preferably includes a two-dimensional array-type optical receiver.

If the optical receiver 122A includes several light receiving regions, the arithmetic processor 186A preferably calculates a quantity of the diffraction light DL entering to the several light receiving regions. For example, with the optical receiver 122A including four separate light receiving regions, the arithmetic processor 186A may calculate push-pull signals from the four separate light receiving regions to identify the central position of the diffraction light DL entering to the optical receiver 122A.

The light receiving region of the optical receiver 122A is preferably separate along the temperature change direction of the diffraction angle of the diffraction light DL as shown in FIG. 6. Therefore, several light receiving regions are aligned along the temperature change direction of the diffraction angle of the diffraction light DL. If the optical receiver 122A is situated on the dashboard between the driver driving the vehicle and the windshield FG of the vehicle, the surface area of the separate light receiving regions is gradually decreased from the windshield FG to the driver. In FIG. 6, the surface area of each light receiving region formed in the region A close to the windshield is larger than the surface area of each light receiving region formed in the region B close to the driver. As a result, even if an incidence position of the diffraction light DL on the optical receiver 122A largely changes with the diffraction angle fluctuation because of the temperature, the push-pull signals may be easily calculated. Even if a spot diameter of the diffraction light DL entering to the optical receiver 122A is comparatively large, the temperature of the hologram optical element 120A is appropriately calculated.

If data showing a relationship between the central position of the diffraction light DL entering to the optical receiver 122A and the temperature of the hologram optical element 120A are stored in advance in the register 185A, the arithmetic processor 186A may calculate a temperature of the hologram optical element 120A in response to the light reception signal from the optical receiver 122A. If data showing a relationship between the central position of the diffraction light DL entering to the optical receiver 122A and the temperature rise of the hologram optical element 120A are stored in advance in the register 185A, the temperature of the hologram optical element 120A is calculated from the measurement value acquired by the second thermometer 121, like the first embodiment. The arithmetic processor 186A may calculate temperature changes from a reference temperature, which is set for the temperature of the hologram optical element 120A, in response to the light reception signal from the optical receiver 122A, and then identify a temperature of the hologram optical element 120A by means of the calculated temperature variation and the measurement value from the second thermometer 121. Like the first embodiment, the arithmetic processor 186A may calculate a correction amount for the image display position in response to the outputs from the second thermometer 121 and the optical receiver 122A.

In the present embodiment, the laser sources 130R, 130G, 130B are sequentially driven (field sequential drive). Therefore, the aforementioned control loop about the image display position may be sequentially applied to the laser sources 130R, 130G, 130B. Accordingly, the shifts of the oscillation wavelengths of the laser sources 130R, 130G, 130B with respect to the current temperature of the hologram optical element 120A are appropriately detected.

Preferably, the laser sources 130R, 130G, 130B are sequentially driven by pulses to decrease a signal/noise ratio. Thus, noises resulting from the external light become less influential.

(Control Method Relating to Display Position)

Figure 8:
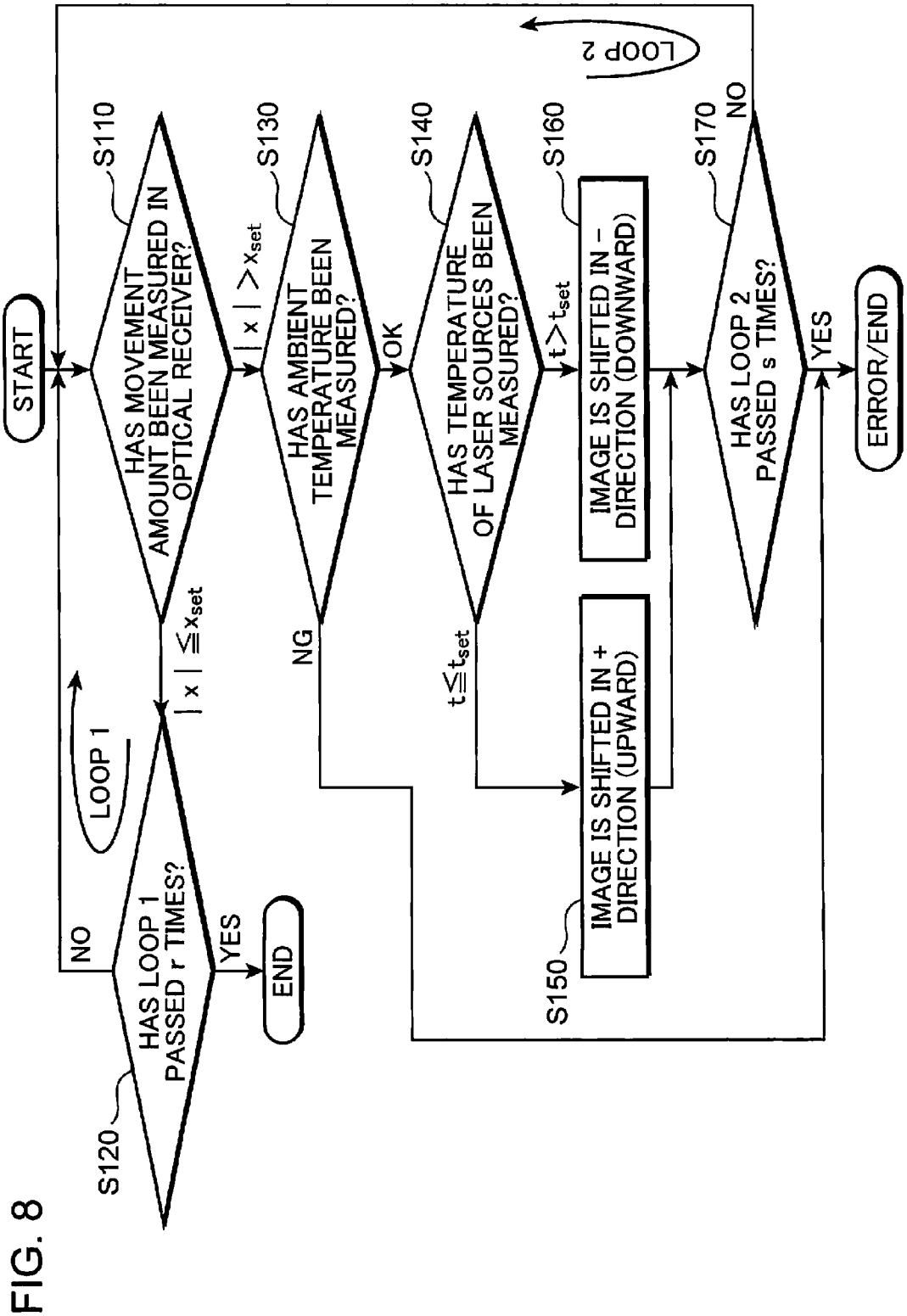
FIG. 8 is a schematic flowchart representing a control method for determining an image display position.
Figure 9:
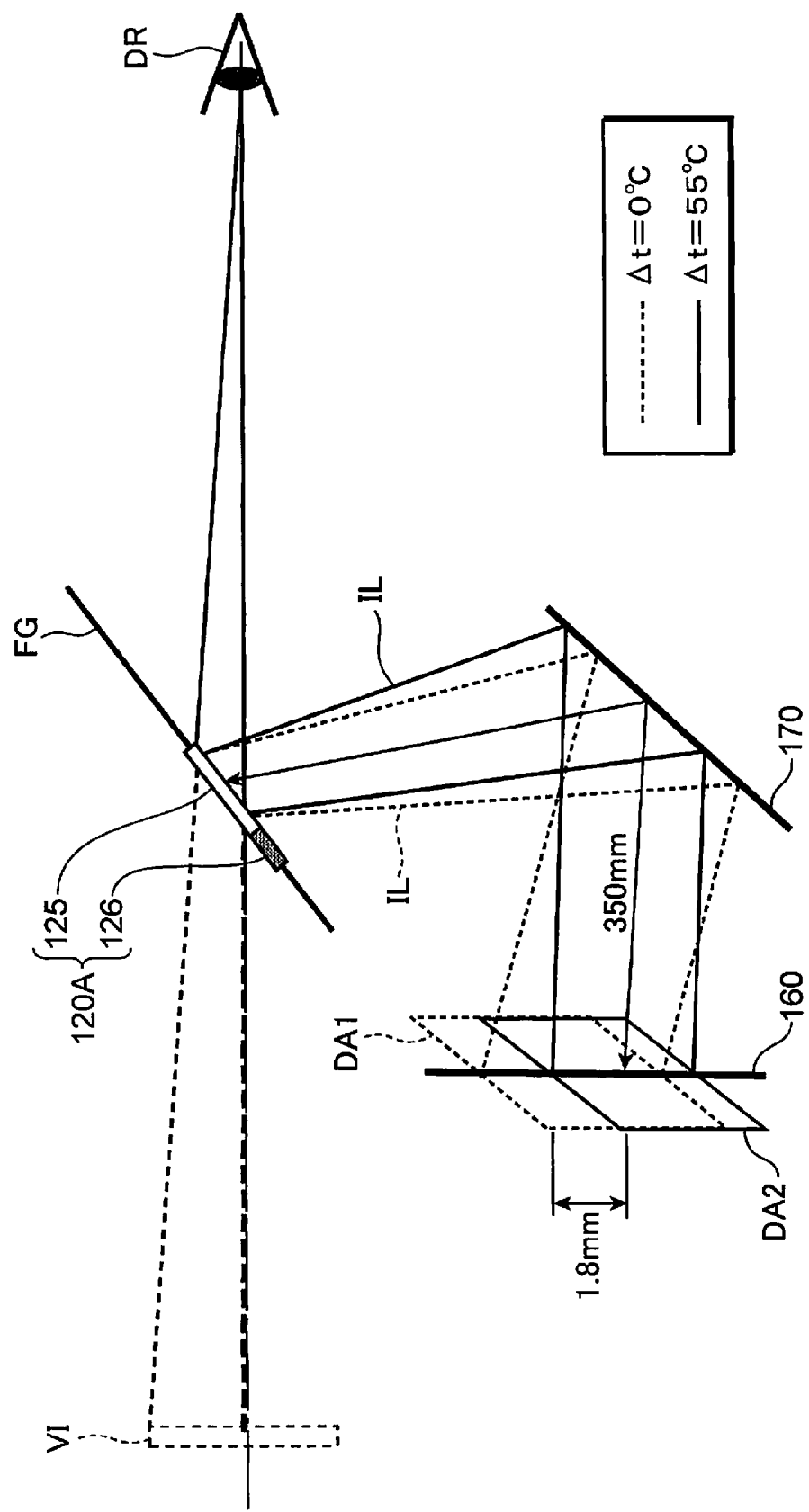
FIG. 9 schematically shows an optical path of image light which is changed under the control performed according to the flowchart shown in FIG. 8.

FIG. 8 is a schematic flowchart showing a control method for determining the image display position. FIG. 9 schematically shows an optical path of the image light IL, which changes in response to the control according to the flowchart shown in FIG. 8. Like FIG. 4, the optical path of the image light IL obtained under 0° C. of the temperature change Δt of the hologram optical element 120A is depicted by a dot line, and the optical path of the image light IL obtained under 55° C. of the temperature change Δt is depicted by a solid line in FIG. 9. A method for compensating the image display position in response to a temperature of the hologram optical element 120A and oscillation wavelengths of the laser sources 130R, 130G, 130B is described with reference to FIGS. 5, 8 and 9. FIG. 8 shows the control performed by means of the optical configuration depicted in FIG. 9. Therefore, with another optical configuration, the shift direction or shift amount of the displayed image may be different from the descriptions with reference to FIG. 8.

The method for controlling the image display position is described with reference to the flowchart shown in FIG. 8. As described above, the head-up display device 100A exemplified as the image display device comprises the second thermometer 121. It may be determined whether or not a movement direction of the diffraction light DL from the second hologram 126 is normal on the basis of the output from the second thermometer 121.

(Step S110)

If the control is started, step S110 is implemented. In step S110, the movement amount (x) of the diffraction light DL on the optical receiver 122A is calculated. A threshold $X_{set}$ set for an absolute value abs(x) of the calculated movement amount of the diffraction light DL is stored in advance in the position controller 181A. The position controller 181A compares the absolute value abs(x) of the movement amount of the diffraction light DL with the threshold $X_{set}$. If the absolute value abs(x) is no more than $X_{set}$, step S120 is implemented. If the absolute value abs(x) is larger than $X_{set}$, step S130 is implemented.

(Step S120)

As shown in FIG. 8, a loop 1 is defined so that processes are repeated between steps S110 and S120. A threshold r set for a number of continuous passage through the loop 1 is defined in advance in the position controller 181A. The position control is ended if processes passing through the loop 1 are continuously repeated r times.

(Step S130)

The second thermometer 121 measures a temperature inside the vehicle cabin as the ambient temperature in step S130. A threshold range about the temperature range set for the measured ambient temperature is stored in the position controller 181A in advance. If the temperature outside the threshold range is measured, the control ends because of control errors, and then an error flag is set. If the temperature within the threshold range is measured, step S140 is implemented.

(Step S140)

The first thermometers 131R, 131G, 131B measure the temperatures t of the laser sources 130R, 130G, 130B in step S140. Threshold temperatures $t_{set}$ are set for the measured temperatures of the laser sources 130R, 130G, 130B in advance in the position controller 181A. The position controller 181A compares the measured temperatures t of the laser sources 130R, 130G, 130B with the threshold temperatures $t_{set}$. If the measured temperatures t are no more than the threshold temperatures $t_{set}$, step S150 is implemented. If the measured temperatures t are higher than the threshold temperatures $t_{set}$, step S160 is implemented.

(Step S150)

In step S150, the position controller 181A shifts the display area upward from the display area DA1 obtained under 0° C. of the temperature change Δt. Then, step S170 is implemented.

(Step S160)

In step S160, the position controller 181A shifts the display area downward from the display area DA1 obtained under 0° C. of the temperature change Δt. Then, step S170 is implemented.

As shown in FIG. 8, a loop 2 is defined so that processes are repeated between steps S110 and S170. A threshold s set for a number of continuous passage through the loop 2 is defined in advance in the position controller 181A. The position control is ended, and then an error flag is set if processes passing through the loop 2 is continuously repeated s times.

If the control according to the flowchart shown in FIG. 8 is implemented, the head-up display device 100A of the present embodiment may appropriately adjust the image display position.

(Acquisition of Wavelength Data)

According to the principles described in the context of the first and second embodiments, the oscillation central wavelength is predicted in response to a temperature of a semiconductor laser device. Alternatively, the oscillation wavelength of the semiconductor laser device may be directly measured. As a result of the direct measurements of the oscillation wavelength of the semiconductor laser device, correct information about the wavelength shift amount of the laser beam emitted from the light source may be acquired. Therefore, it becomes accurate to control the image display position.

Figure 10A:
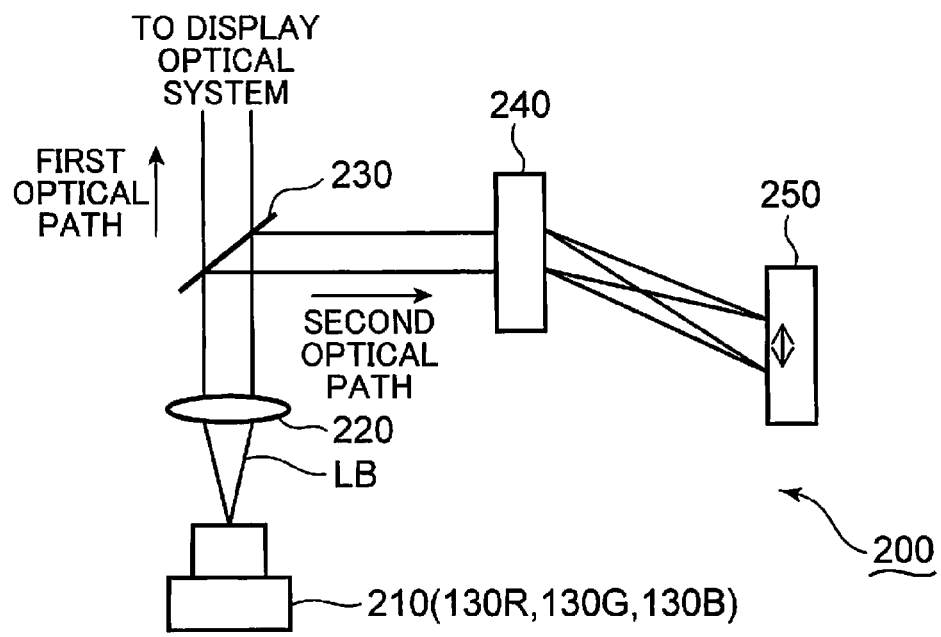
FIG. 10A is a schematic view of an optical system for acquiring wavelength data about wavelength variations of laser beams.
Figure 10B:
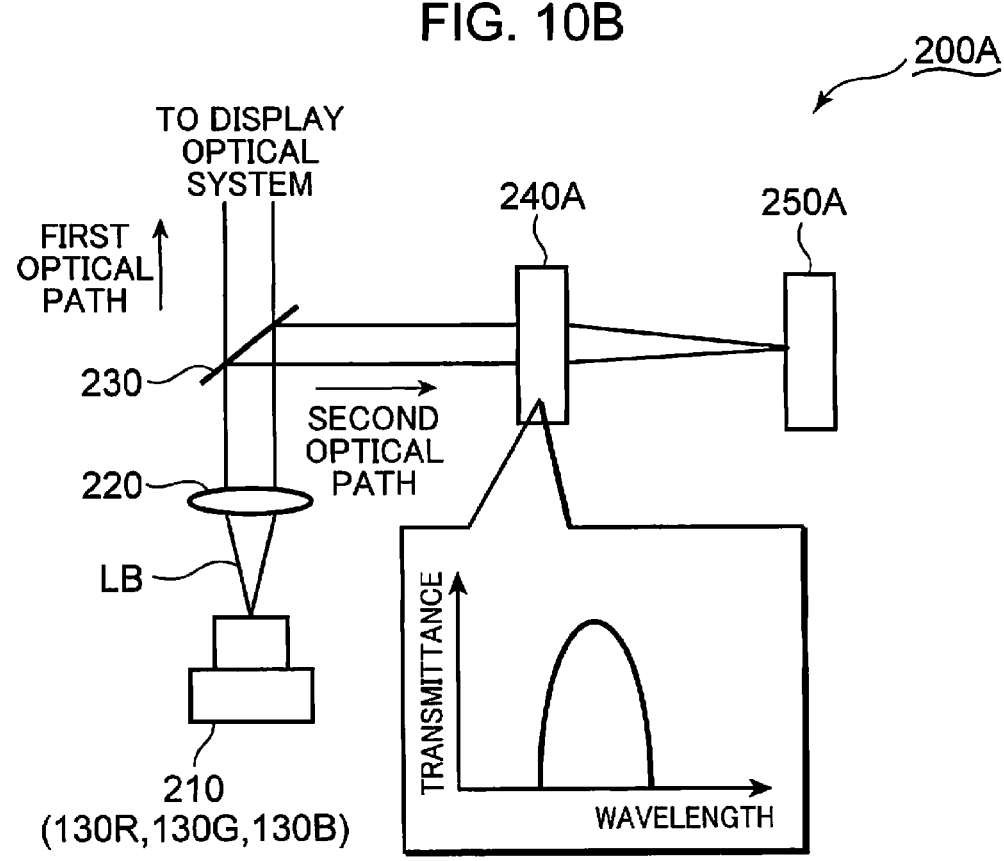
FIG. 10B is a schematic view of an optical system for acquiring the wavelength data about the wavelength variations of the laser beams.

FIGS. 10A and 10B are schematic views of an optical system configured to acquire wavelength data about variations in laser beam wavelengths. Principles of the wavelength data acquisition, which is described with reference to the FIGS. 10A and 10B may be advantageously applied to the image display device described in the context of the aforementioned first and second embodiments. The optical system for acquiring the wavelength data is described with reference to FIGS. 1, 5, 10A and 10B.

FIG. 10A schematically shows an optical system 200 which acquires the wavelength data. The optical system 200 comprises a semiconductor laser source 210. The semiconductor laser source 210 emits a laser beam LB. The semiconductor laser source 210 corresponds to any one of the laser sources 130R, 130G, 130B described with reference to FIGS. 1 and 5.

The optical system 200 is further provided with a collimator lens 220 and a beam splitter 230. The collimator lens 220 converts the laser beam LB from the semiconductor laser source 210 into a collimated beam. The laser beam LB then travels to the beam splitter 230. The beam splitter 230 defines a first optical path toward a display optical system which shows the driver an image and a second optical path which branches off from the first optical path and serves to acquire the wavelength data. Therefore, the beam splitter 230 divides the laser beam LB from the collimator lens 220 into beams toward the first and second optical paths.

The laser beam LB travelling along the first optical path is then multiplexed, shaped and then emitted as the image light IL from the image forming unit 140.

The optical system 200 further comprises a hologram optical element 240 which receives the laser beam LB travelling along the second optical path and an optical receiver array 250 which receives the laser beam LB diffracted by the hologram optical element 240. The diffraction angle of the hologram optical element 240 changes with a wavelength of the laser beam LB. Therefore, if there is a change in the wavelength of the laser beam LB emitted from the semiconductor layer beam source 210, the irradiation position of the laser beam LB on the optical receiver array 250 may be also changed. The displacement (change) of the wavelength may thus be detected in response to the irradiation position of the laser beam LB on the optical receiver array 250. The hologram optical element 240 and the optical receiver array 250 are exemplified as the wavelength measurement portion.

The optical receiver array 250 outputs wavelength data about the wavelength (irradiation position) measured by the position controllers 181, 181A. The position controllers 181, 181A adjust the image display position by means of the wavelength data as described above.

FIG. 10B schematically shows an optical system 200A which acquires wavelength data. The optical system 200A is provided with the semiconductor laser source 210, the collimator lens 220, and the beam splitter 230, like the optical system 200 described with reference to FIG. 10A. The optical system 200A is further provided with a wavelength filter 240A which partially allows passage of the laser beam LB, which is separated by the beam splitter 230 and travels along the second optical path. The transmission characteristics of the wavelength filter 240A depend on the wavelength. The light quantity of the laser beam LB transmitted by the wavelength filter 240A changes in response to the wavelength of the laser beam LB.

FIG. 10B shows a schematic graph showing the transmission characteristics of the wavelength filter 240A. If the wavelength filter 240A with the characteristics corresponding to the graph shown in FIG. 10B is provided in the second optical path and if the optical output from the semiconductor laser source 210 is consistent, the optical output (quantity of light) of the laser beam LB passed through the wavelength filter 240A changes in response to the wavelength of the laser beam LB.

The optical system 200A further comprises with a detector 250A which detects the light quantity passed through the wavelength filter 240A. For example, the detector 250A may be an optical element which detects the light quantity, such as a photodiode. As aforementioned, since the variations in light quantity are associated with wavelength variations of the laser beam LB, wavelength data about the wavelength of the laser beam LB may be obtained in response to the variations in light quantity. The detector 250A may be an optical element simpler than the optical receiver array 250 provided in the optical system 200. In such a case, the optical system 200A is simplified. The wavelength filter 240A is exemplified as the transmission element. The detector 250A is exemplified as the light quantity detector.

The detector 250A outputs wavelength data about the wavelength (irradiation position) measured by the position controllers 181, 181A. The position controllers 181, 181A adjust the image display position in response to the wavelength data as aforementioned.

In the optical system 200A, the wavelength shift amount is detected as the light quantity. Therefore, the light quantity value in correspondence to the applied current is studied in advance.

(Scanning Optical System)

The principles of the first and second embodiments are described mainly in relation to the head-up display devices 100, 100A, which uses a two-dimensional modulator as the image forming unit 140. However, a scanning optical system in which image formation and image display are performed by means of scanning operation by means of a mirror element may be used as the image forming unit.

If such scanning optical system is used as an image forming unit, the display position of the image formed by the image forming unit may be finely adjusted in correspondence to the driver's eye position.

FIG. 11 is a schematic view representing a method for adjusting the image display position in correspondence to the driver's eye position. The method for adjusting the image display position in correspondence with the driver's eye position is described with reference to FIG. 11.

FIG. 11 shows driver's eyes E1 present at a first height position and driver's eyes E2 present at a second height position which is higher by 50 mm than the first height position. The optical path of the image light IL which reaches the eyes E1 is shown by a solid line in FIG. 11. A display position DP1 of the image viewed by the eyes E1 is shown by a solid line in FIG. 11. If the image is displayed at the display position DP1, the image light IL is reflected by the hologram mirror 120 attached to the windshield FG and reaches the eyes E1. As a result, the driver views the virtual image VI through the windshield FG.

If the driver changes the eye position to the second height position, the optical path of the image light IL offsets from the driver's eyes. Therefore, the driver faces a difficulty in viewing the image. The driver may operate the image display device to adjust the image display position.

FIG. 11 shows a display position DP2 which is shifted by 0.11 mm from the display position DP1. The image light IL traveling from the display position DP2 is shown by a dot line in FIG. 11.

If the image is displayed at the display position DP2, the image light IL reflected by the hologram mirror 120 reaches the eyes E2 which are higher by 50 mm than the eyes E1. Thus, the driver may change the image display position to view a clear image.

Figure 12:
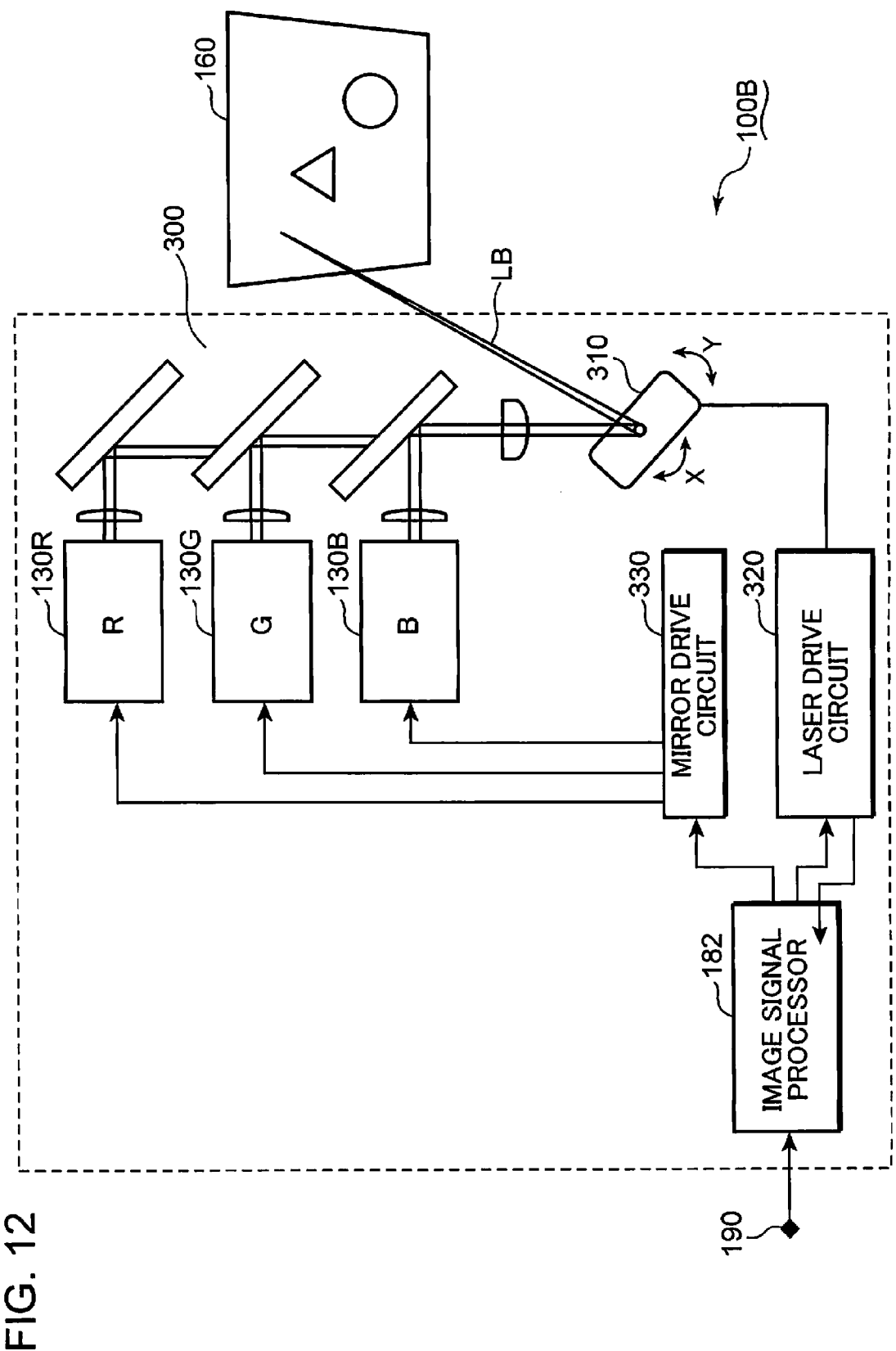
FIG. 12 is a schematic view of a head-up display device incorporating a scanning optical system.

FIG. 12 is a schematic view of a head-up display device exemplified as the image display device. The head-up display device incorporating the scanning optical system is described with reference to FIG. 12.

Like the head-up display devices 100, 100A described in the context of the aforementioned series of embodiments, the head-up display device 100B is provided with the laser sources 130R, 130G, 130B, the input port 190, the image signal processor 182, and the intermediate screen 160. The head-up display device 100B is further provided with an optical system 300 which shapes and multiplexes the laser beams LB emitted from the laser sources 130R, 130G, 130B, a scanning mirror 310 which scans the laser beam LB shaped and multiplexed by the optical system 300 over the intermediate screen 160, and a mirror driver circuit 320 which drives the scanning mirror 310. The scanning mirror 310 oscillates about the X and Y axes in response to the signals generated by the mirror driver circuit 320, and vertically and horizontally scans the laser beam LB. Because the laser beam LB is scanned by the scanning mirror 310 driven by the mirror drive circuit 320, an image is rendered on the intermediate screen 160. The scanning mirror 310 is exemplified as the reflector.

Data about the image displayed by the head-up display device 100B are input as electric signals to the input port 190. The image signal processor 182 resolves the image data into brightness data and color data for each pixel. The image signal processor 182 generates timing signals which define turn-on timings of the laser sources 130R, 130G, 130B in response to information about the oscillation frequency of the scanning mirror 310 sent as electric signals from the mirror drive circuit 320.

The head-up display device 100B is further provided with a laser drive circuit 330 which drives the laser sources 130R, 130G, 130B. The image signal processor 182 outputs the aforementioned timing signals as electric signals to the laser drive circuit 330. The laser drive circuit 330 supplies the necessary currents to the laser sources 130R, 130G, 130B in response to the received timing signals. As a result, the laser sources 130R, 130G, 130B are turned on.

The optical configuration after the intermediate screen 160 is similar to that of the head-up display devices 100, 100A described in the context of the aforementioned series of embodiments.

The scanning mirror 310 may be an electrostatically driven MEMS mirror, a piezoelectrically driven MEMS mirror, an electromagnetically driven MEMS mirror or a galvano mirror driven by motor revolution. These mirrors may be used in the head-up display device 100B exemplified as the image display device. In particular, characteristics of the electrostatically driven MEMS mirror and piezoelectrically driven MEMS mirror easily change in response to an ambient temperature or a presence of laser irradiation. Therefore, if these mirrors are used in an image display device, the turn-on timings of laser sources may be appropriately corrected in response to the surrounding environment which changes with time. Therefore, the correction of the image display position is implemented in response to the temperature characteristics of the MEMS mirror.

A head-up display may be configured by means of the optical configuration shown in FIG. 12.

The aforementioned embodiments mainly include the following configurations. As long as an image display device provided with the following configuration is used, changes in oscillation wavelength of laser sources may be synchronized with variations in diffraction angle of diffraction element. As a result, the image display device may display an image with sufficiently little color aberration, blurring and resolution degradation.

An image display device according to one aspect of the aforementioned embodiments is provided with a laser source configured to emit a laser beam; an image forming element which uses the laser beam to emit image light for displaying an image; a first diffraction element configured to diffract the image light; and a controller configured to control a display position of the image in response to a wavelength of the laser beam and a temperature of the first diffraction element.

According to the aforementioned configuration, the image forming element emits image light to display an image by means of a laser beam from the laser source. The controller controls the image display position in response to the laser beam wavelength and the temperature of the first diffraction element which diffracts the image light. Thus, it becomes less likely that changes in the laser beam wavelength or the temperature of the first diffraction element degrade image quality.

In the aforementioned configuration, it is preferred that the image display device further includes a first thermometer which measures at least one of a temperature of the laser source and a temperature around the laser source to output first temperature data; and a second thermometer which measures at least one of a temperature of the first diffraction element and a temperature around the first diffraction element to output second temperature data, wherein the controller controls the display position of the image in response to the first and second temperature data.

According to the above configuration, the first thermometer which measures at least one of the temperature of the laser source and the temperature around the laser source to output the first temperature data. The second thermometer which measures at least one of the temperature of the first diffraction element and the temperature around the first diffraction element to output second temperature data. The controller controls the display position of the image in response to the first and second temperature data. Thus, it becomes less likely that changes in the laser beam wavelength, which are attributed to the temperature of the laser source, and changes in the temperature of the first diffraction element degrade image quality.

In the above configuration, it is preferred that the controller determines a shift amount for the display position of the image in response to the first and second temperature data to output shift information about the shift amount to the image forming element, and the image forming element changes the display position of the image in response to the shift information.

According to the above configuration, the controller which determines the shift amount for the image display position in response to the first and second temperature data to output shift information about the shift amount to the image forming element. The image forming element changes the image display position in response to the shift information. Therefore, it becomes less likely that changes in the laser beam wavelength, which are attributed to the temperature of the laser source, and changes in the temperature of the first diffraction element degrade image quality.

In the aforementioned configuration, it is preferred that the laser source includes a first laser source which emits a first laser beam of a first hue and a second laser source which emits a second laser beam of a second hue, the image is represented by a first image rendered by the first laser beam and a second image rendered by the second laser beam, the shift information includes first shift information about a shift amount of a display position of the first image and second shift information about a shift amount of a display position of the second image, and the controller independently changes the display positions of the first and second images in response to the first and second shift information.

According to the aforementioned configuration, the laser source includes the first laser source which emits the first laser beam of the first hue and the second laser source which emits the second laser beam of the second hue. The image is represented by the first and second images rendered by the first and second laser beams, respectively. The shift information includes first and second shift information about the shift amounts of the display positions of the first and second images, respectively. The controller independently changes the display positions of the first and second images in response to the first and second shift information to display quality images.

In the aforementioned configuration, it is preferable that the image display device is further provided with a photometer which measures a quantity of at least one of external light that enters the first diffraction element and external light that falls around the first diffraction element to output light quantity data about the quantity of the at least one of the external lights, wherein the controller generates shift information in response to the first temperature data, the second temperature data and the light quantity data.

According to the above configuration, the photometer which measures a quantity of at least one of external light which enters the first diffraction element and external light falling around the first diffraction element to output light quantity data about the quantity of the at least one of the external lights. The controller generates shift information in response to the first and second temperature data and the light quantity data, which results in more appropriate control to the image display position.

In the aforementioned configuration, it is preferred that the second thermometer includes a second diffraction element which partially diffracts the image light in a different direction from the first diffraction element and a light receiving element which receives the image light diffracted by the second diffraction element, the second diffraction element changes a diffraction direction of the image light in response to a temperature of the second diffraction element, and the second temperature data corresponding to a change in the diffraction direction is output from the light receiving element to the controller.

According to the aforementioned configuration, the second thermometer includes the second diffraction element which partially diffracts the image light in a different direction from the first diffraction element and the light receiving element which receives the image light diffracted by the second diffraction element. The second diffraction element changes the diffraction direction of the image light in response to the temperature of the second diffraction element. The light receiving element outputs the second temperature data corresponding to a change in the diffraction direction to the controller. Thus, it becomes less likely that changes in the laser beam wavelength, which is attributed to the temperature of the laser source, and changes in the temperature of the first diffraction element degrade image quality.

In the aforementioned configuration, it is preferable that the image display device further includes a filter provided in the light receiving element, wherein the filter suppresses stray light.

According to the above configuration, the filter configured to suppress the stray light is provided in the light receiving element to reduce unnecessary diffraction of the image light.

In the above configuration, it is preferred that the image forming element scans the laser beam to form the image; and the light receiving element includes light receiving regions.

According to the aforementioned configuration, the image forming element scans the laser beam to form the image. The light receiving element includes light receiving regions, which results in accurate second temperature data even under scanning of the laser beam.

In the aforementioned configuration, it is preferred that the light receiving element includes light receiving regions aligned in a change direction of the diffraction direction.

According to the aforementioned configuration, the light receiving element includes light receiving regions which are aligned in the change direction of the diffraction direction, which results in accurate detection of the change in the diffraction direction.

In the aforementioned configuration, it is preferable that the image display device further includes a power supply which supplies power to the laser source, wherein the controller controls the power supply to stop the supply of the power unless the light receiving element receives the image light or if a quantity of the image light received by the light receiving element is less than a light quantity threshold which is set for the quantity of the light.

According to the aforementioned configuration, the image display further comprises a power supply which supplies power to the laser source. The controller controls the power supply to stop the supply of power unless the light receiving element receives the image light or if the quantity of the image light received by the light receiving element is less than a light quantity threshold which is set for the quantity of the light. Therefore, the image display device becomes safer.

In the aforementioned configuration, the controller preferably includes: a memory which stores data of temperature characteristics including temperature characteristics of the laser source and the first diffraction element; a generator configured to generate the shift information in response to the first temperature data, the second temperature data and the data of the temperature characteristics; and an output portion which generates and outputs a signal including the shift information.

According to the above configuration, the memory of the controller stores the data of the temperature characteristics including temperature characteristics of the laser source and the first diffraction element. The generator of the controller generates shift information in response to the first and second temperature data and the data of the temperature characteristics. The output portion generates and outputs a signal including the shift information. Therefore it becomes less likely that changes in the temperatures of the laser source and the first diffraction element degrade image quality.

In the above configuration, it is preferable that the image display device further includes a wavelength measurement portion which measures a wavelength of the laser beam to output wavelength data about the wavelength, wherein the controller controls the display position of the image in response to the wavelength data and the second temperature data.

According to the above configuration, the wavelength measurement portion which measures the wavelength of the laser beam to output wavelength data about the wavelength. The controller controls the image display position in response to the wavelength data and the second temperature data. Thus, it becomes less likely that changes in the laser beam wavelength or the temperature of the first diffraction element degrade image quality.

In the aforementioned configuration, it is preferred that the wavelength measurement portion includes a hologram element which diffracts the laser beam, and an light receiving array which receives the laser beam diffracted by the hologram element to detect a change in diffraction angle by the hologram element, and the hologram element changes the diffraction angle for the laser beam in response to the wavelength of the laser beam.

According to the above configuration, the wavelength measurement portion includes a hologram element which diffracts the laser beam and a light receiving array which receives the laser beam diffracted by the hologram element to detect a change in the diffraction angle of the hologram element. The hologram element changes the diffraction angle of the laser beam in response to the wavelength of the laser beam, which results in appropriate detection of changes in the laser beam wavelength.

In the aforementioned configuration, it is preferred that the wavelength measurement portion includes a transmission element which partially transmits the laser beam, and a light quantity detector configured to detect a light quantity of the laser beam transmitted through the transmission element, the transmission element changes a transmitted light quantity of the laser beam in response to the wavelength of the laser beam, and the light quantity detector generates the wavelength data in response to changes in the transmitted light quantity.

According to the above configuration, the wavelength measurement portion has a transmission element which partially transmits the laser beam, and a light quantity detector which detects a light quantity of the laser beam transmitted by the transmission element. The transmission element changes the transmitted light quantity of the laser beam in response to the wavelength of the laser beam. The light quantity detector generates the wavelength data in response to changes in the transmitted light quantity. Thus, it becomes less likely that changes in the laser beam wavelength or the temperature of the first diffraction element degrade image quality.

In the aforementioned configuration, it is preferred that the image forming element includes a reflector configured to scan the laser beam.

According to the aforementioned configuration, the image forming element includes the reflector configured to scan the laser beam, which results in a highly precise image and low power consumption.

In the aforementioned configuration, it is preferred that the reflector includes a MEMS mirror which is electrostatically or piezoelectrically driven.

According to the above configuration, the reflector includes the MEMS mirror which is electrostatically or piezoelectrically driven, which results in a highly precise image and low power consumption.

In the above configuration, it is preferred that the first diffraction element is attached to a windshield of a vehicle.

According to the aforementioned configuration, since the first diffraction element is attached to the windshield of the vehicle, the image display device may be advantageously used as a head-up display device for the vehicle.

In the aforementioned configuration, it is preferred that the aforementioned image display device is mounted on a vehicle, wherein the light receiving element provided between a driver driving the vehicle and a windshield of the vehicle includes a first light receiving region and a second light receiving region which is closer to the driver than the first light receiving region, and the second light receiving region has a larger light receiving surface than the first light receiving region has.

According to the above configuration, the aforementioned image display device is mounted on the vehicle and used as an image display device for the vehicle. The light receiving element provided between a driver driving the vehicle and the windshield of the vehicle includes the first light receiving region and the second light receiving region which is closer to the driver than the first light receiving region. The second light receiving region has a larger light receiving surface than the first light receiving region has, which results in appropriate detection of changes in the laser beam wavelength.

INDUSTRIAL APPLICABILITY

During usage of the image display device according to the principles of the present embodiments, the shift amounts of emission spectra of laser beams may be synchronized with variations in the hologram diffraction angle. As a result, it becomes less likely that image quality such as color aberration, blurring and resolution degradation becomes worse. Thus, the principles of the present embodiments may be preferably used in various image display devices such as head-up displays and head-mounted displays.

The invention claimed is:

1. An image display device comprising:
a laser source configured to emit a laser beam;
an image forming element which uses the laser beam to emit image light for displaying an image;
a first diffraction element configured to diffract the image light;
a controller configured to control a display position of the image in response to a wavelength of the laser beam and a temperature of the first diffraction element;
a first thermometer which measures at least one of a temperature of the laser source and a temperature around the laser source to output first temperature data; and
a second thermometer which measures at least one of a temperature of the first diffraction element and a temperature around the first diffraction element to output second temperature data, wherein
the controller controls the display position of the image in response to the first and second temperature data.

2. The image display device according to claim 1, wherein
the controller determines a shift amount for the display position of the image in response to the first and second temperature data to output shift information about the shift amount to the image forming element, and
the image forming element changes the display position of the image in response to the shift information.

3. The image display device according to claim 2, wherein
the laser source includes a first laser source which emits a first laser beam of a first hue and a second laser source which emits a second laser beam of a second hue,
the image is represented by a first image rendered by the first laser beam and a second image rendered by the second laser beam,
the shift information includes first shift information about a shift amount of a display position of the first image and second shift information about a shift amount of a display position of the second image, and
the controller independently changes the display positions of the first and second images in response to the first and second shift information.

4. The image display device according to claim 2, further comprising a photometer which measures a quantity of at least one of external light that enters the first diffraction element and external light that falls around the first diffraction element to output light quantity data about the quantity of the at least one of the external lights, wherein
the controller generates shift information in response to the first temperature data, the second temperature data and the light quantity data.

5. The image display device according to claim 1, wherein
the second thermometer includes a second diffraction element which partially diffracts the image light in a different direction from the first diffraction element and a light receiving element which receives the image light diffracted by the second diffraction element,
the second diffraction element changes a diffraction direction of the image light in response to a temperature of the second diffraction element, and
the second temperature data corresponding to a change in the diffraction direction is output from the light receiving element to the controller.

6. The image display device according to claim 5, further comprising a filter provided in the light receiving element, wherein
the filter suppresses stray light.

7. The image display device according to claim 5, wherein
the image forming element scans the laser beam to form the image; and
the light receiving element includes light receiving regions.

8. The image display device according to claim 5, wherein
the light receiving element includes light receiving regions aligned in a change direction of the diffraction direction.

9. The image display device according to claim 2, further comprising a power supply which supplies power to the laser source, wherein
the controller controls the power supply to stop the supply of the power unless the light receiving element receives the image light or if a quantity of the image light received by the light receiving element is less than a light quantity threshold which is set for the quantity of the light.

10. The image display device according to claim 1, wherein the controller includes:
a memory which stores data of temperature characteristics including temperature characteristics of the laser source and the first diffraction element;
a generator configured to generate the shift information in response to the first temperature data, the second temperature data and the data of the temperature characteristics; and
an output portion which generates and outputs a signal including the shift information.

11. The image display device according to claim 10, further comprising a wavelength measurement portion which measures a wavelength of the laser beam to output wavelength data about the wavelength, wherein
the controller controls the display position of the image in response to the wavelength data and the second temperature data.

12. The image display device according to claim 11, wherein
the wavelength measurement portion includes a hologram element configured to diffract the laser beam, and a light receiving array which receives the laser beam diffracted by the hologram element to detect a change in diffraction angle by the hologram element, and
the hologram element changes the diffraction angle for the laser beam in response to the wavelength of the laser beam.

13. The image display device according to claim 12, wherein
- the wavelength measurement portion includes a transmission element which partially transmits the laser beam, and a light quantity detector configured to detect a light quantity of the laser beam transmitted through the transmission element,
- the transmission element changes a transmitted light quantity of the laser beam in response to the wavelength of the laser beam, and
- the light quantity detector generates the wavelength data in response to a change in the transmitted light quantity.

14. The image display device according to claim 1, wherein the image forming element includes a reflector for scanning the laser beam.

15. The image display device according to claim 14, wherein the reflector includes a MEMS mirror which is electrostatically or piezoelectrically driven.

16. The image display device according to claim 1, wherein the first diffraction element is attached to a windshield of a vehicle.

17. An image display device for a vehicle in which the image display device according to claim 5 is mounted on a vehicle, wherein
- the light receiving element provided between a driver driving the vehicle and a windshield of the vehicle includes a first light receiving region and a second light receiving region which is closer to the driver than the first light receiving region, and
- the second light receiving region has a larger light receiving surface than the first light receiving region has.

* * * * *